United States Patent
Deng et al.

(10) Patent No.: US 7,203,001 B2
(45) Date of Patent: Apr. 10, 2007

(54) OPTICAL RETARDERS AND RELATED DEVICES AND SYSTEMS

(75) Inventors: Xuegong Deng, Piscataway, NJ (US); Jian Jim Wang, Orefield, PA (US); Feng Liu, Allentown, PA (US)

(73) Assignee: NanoOpto Corporation, Somerset, NJ (US)

( * ) Notice: Subject to any disclaimer, the term of this patent is extended or adjusted under 35 U.S.C. 154(b) by 0 days.

(21) Appl. No.: 10/918,299

(22) Filed: Aug. 13, 2004

(65) Prior Publication Data

US 2005/0045799 A1  Mar. 3, 2005

Related U.S. Application Data

(60) Provisional application No. 60/531,047, filed on Dec. 19, 2003.

(51) Int. Cl.
*G02B 5/30* (2006.01)

(52) U.S. Cl. .................. 359/486; 359/576; 359/569

(58) Field of Classification Search ................ 359/569, 359/566, 576, 558, 483, 485, 486
See application file for complete search history.

(56) References Cited

U.S. PATENT DOCUMENTS

| | | | |
|---|---|---|---|
| 5,377,044 A * | 12/1994 | Tomono et al. ............. | 359/566 |
| 5,638,197 A | 6/1997 | Gunning et al. ............... | 349/96 |
| 5,851,849 A | 12/1998 | Comizzoli et al. ............ | 438/38 |
| 5,852,688 A | 12/1998 | Brinkman et al. ............ | 385/16 |
| 6,576,053 B1 | 6/2003 | Kim et al. ..................... | 117/89 |
| 6,613,695 B2 | 9/2003 | Pomarede et al. .......... | 438/767 |
| 6,618,104 B1 | 9/2003 | Date et al. ..................... | 349/86 |
| 6,661,952 B2 | 12/2003 | Simpson et al. .............. | 385/37 |
| 6,692,797 B1 | 2/2004 | Owen et al. ................. | 728/1.2 |
| 6,947,215 B2 * | 9/2005 | Hoshi .......................... | 359/576 |
| 2001/0051443 A1 | 12/2001 | Koo ............................ | 438/765 |
| 2002/0003664 A1 | 1/2002 | Mearini et al. ............. | 359/586 |
| 2002/0012172 A1 | 1/2002 | Steinberg et al. ........... | 359/577 |
| 2003/0022425 A1 | 1/2003 | Tungare ..................... | 438/197 |
| 2003/0026575 A1 | 2/2003 | Lempkowski ............... | 385/131 |
| 2003/0227597 A1 | 12/2003 | Silverstein et al. .......... | 353/20 |
| 2004/0043149 A1 | 3/2004 | Gordon et al. ......... | 427/255.31 |
| 2004/0208994 A1 | 10/2004 | Harkonen et al. ....... | 427/249.1 |

FOREIGN PATENT DOCUMENTS

WO    WO 9918458 A1 *  4/1999

OTHER PUBLICATIONS

Bokor et al. "Achromatic phase retarder by slanted illumination of a dielectric grating with period comparable with the wavelength." Applied Optics, 40:13, pp. 2076-2080, May 1, 2001.

(Continued)

*Primary Examiner*—Arnel Lavarias
(74) *Attorney, Agent, or Firm*—Fish & Richardson P.C.

(57) ABSTRACT

In certain aspects, the disclosure relates to articles that include a plurality of walls configured to form a grating. Each of the plurality of walls can include a layer of a first material and a layer of a second material different from the first material. The articles can retard incident radiation at wavelengths $\lambda_1$ and $\lambda_2$ by amounts $\Gamma_1$ and $\Gamma_2$, respectively, where $|\lambda_1-\lambda_2|$ is about 15 nm or more and $\Gamma_1$ is substantially equal to $\Gamma_2$.

18 Claims, 10 Drawing Sheets

OTHER PUBLICATIONS

Cescato et al. "Holographic quarterwave plates." Applied Optics, 29:22, pp. 3286-3290, Aug. 1, 1990.

Enger et al. "Optical elements with ultrahigh spatial-frequency surface corrugations." Applied Optics, 22:20, pp. 3220-3228, Oct. 15, 1983.

Flanders, Dale C. "Submicrometer periodicity gratings as artificial anisotropic dielectrics." Appl. Phys. Lett., 42:6, pp. 492-494, Mar. 15, 1983.

Guo, L. Jay. "Recent progress in nanoimprint technology and its applications." Journal of Physics D: Applied Physics. 37, pp. R123-R141, 2004.

Hausmann et al. "Rapid Vapor Deposition of Highly Conformal Silica Nanolaminates." Science. 298, pp. 402-406, Oct. 11, 2002.

Kikuta et al. "Archromatic quarter-wave plates using the dispersion of form birefringence." Applied Optics. 36:7, pp. 1566-1572, Mar. 1, 1997.

Lugmair et al. "New Tris (tert-butoxy)silixy Complexes of Aluminum and Their Transformation to Homogeneous Aluminosilicate Materials via Low-Temperature Thermolytic Pathways." Chem. Mater., 14, pp. 888-898, 2002.

Tyan et al. "Design, fabrication, and characterization of form-birefringent multilayer polarizing beam splitter." J. Opt. Soc. Am. A, 14:7, pp. 1627-1636, Jul. 1997.

Tyan et al. "Polarizing beam splitter based on the anisotropic spectral relectivity characteristic of form-birefringent multplayer gratings." Optics Letters, 21:10, 761-763, May 15, 1996.

Tyan et al. "Subwavelength Multilayer Binary Grating Design for Implementing Photonic Crystals." OSA Tech Digest Series, 9, Topical Meeting on Quantum Optoelectronics, 1997.

Zaitsu et al. "Optical thin films consisting of nanoscale laminated layers." Appl. Phys. Lett., 80:14, pp. 2442-2444, Apr. 8, 2002.

\* cited by examiner

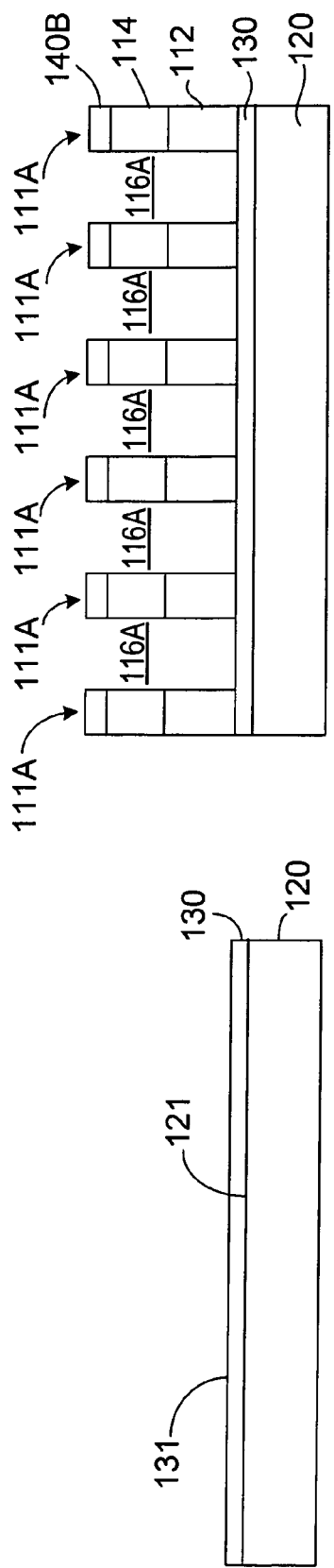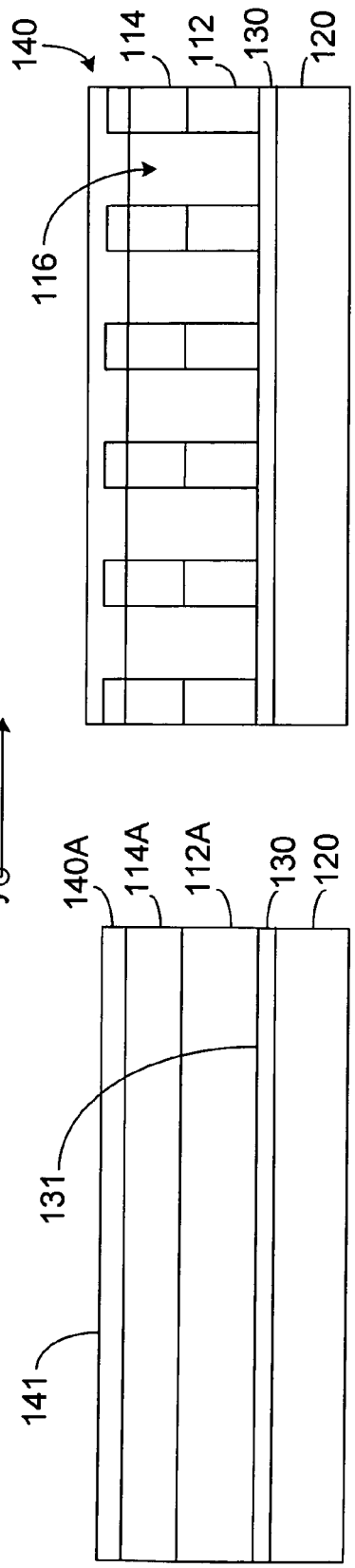

US 7,203,001 B2

OPTICAL RETARDERS AND RELATED DEVICES AND SYSTEMS

CROSS-REFERENCE TO RELATED APPLICATIONS

This application claims priority under 35 U.S.C. §119 to U.S. Provisional Patent Application Ser. No. 60/531,047, entitled "ACHROMATIC WAVEPLATES, DISPERSION CONTROLLED PHASEPLATES, AND METHODS TO MAKE THE SAME," and filed on Dec. 19, 2003, the entire contents of which are hereby incorporated by reference.

TECHNICAL FIELD

This invention relates to optical retarders and related devices and systems.

BACKGROUND

Optical devices and optical systems are commonly used where manipulation of light is desired. Examples of optical devices include lenses, polarizers, optical filters, antireflection films, retarders (e.g., quarter-waveplates), and beam splitters (e.g., polarizing and non-polarizing beam splitters).

SUMMARY

In a first aspect, the invention features an article including a plurality of walls configured to form a grating. Each of the plurality of walls includes a layer of a first material and a layer of a second material different from the first material. The article retards incident radiation at wavelengths $\lambda_1$ and $\lambda_2$ by amounts $\Gamma_1$ and $\Gamma_2$, respectively, where $|\lambda_1-\lambda_2|$ is about 15 nm or more and $\Gamma_1$ is substantially equal to $\Gamma_2$.

In another aspect, the invention features an article including a plurality of walls configured to form a grating wherein each of the plurality of walls includes a layer of a first material and a layer of a second material different from the first material. The article transmits about 70% or more of incident radiation at wavelength $\lambda_1$ propagating along an optical axis of the article, where $\lambda_1$ is in a range from about 150 nm to about 2,000 mm.

In a further aspect, the invention features an article including a plurality of walls extending along a first axis configured to form a grating, where each of the plurality of walls includes a layer of a first dielectric material and a layer of a second dielectric material different from the first dielectric material. Adjacent walls are separated by about 10 nm or more along a second axis, each wall has a thickness of about 1,000 nm or less along the second axis and a thickness of about 100 microns or less along a third axis, and the first, second, and third axes are orthogonal to each other.

In another aspect, the invention features an article including a plurality of walls extending along a first axis configured to form a grating, where each of the plurality of walls includes a layer of a first material, the first material having a refractive index of about 3 or less at a wavelength $\lambda_1$, and a layer of a second dielectric material different from the first dielectric material, the second dielectric material having a refractive index of about 3 or less at $\lambda_1$. Adjacent walls are separated by about 10 nm or more along a second axis, each wall has a thickness of about 1,000 nm or less along the second axis and a thickness of about 100 microns or less along a third axis, and the first, second, and third axes are orthogonal to each other.

In a further aspect, the invention features an article including a plurality of walls configured to form a grating, where each of the plurality of walls comprising four or fewer layers includes a layer of a first material and a layer of a second material different from the first material. The article is birefringent for incident radiation of wavelength $\lambda_1$ propagating along the optical axis.

Embodiments of the articles can include one or more of the following features.

$(\lambda_1+\lambda_2)/2$ can be in a range from about 150 nm to about 2,000 nm. $|\lambda_1-\lambda_2|$ can be about 30 nm or more (e.g., about 50 nm or more, about 75 nm or more, about 100 nm or more, about 150 nm or more, about 200 nm or more, about 300 nm or more, about 500 nm or more). $|\Gamma_1-\Gamma_2|$ can be about $0.03\pi$ or less (e.g., about $0.02\pi$ or less, about $0.01\pi$ or less, about $0.005\pi$ or less, about $0.002\pi$ or less). The article can retard incident radiation propagating through the article having wavelengths within a range from about $\lambda_2$ to about $\lambda_1$ by about $0.05\pi$ or less (e.g., about $0.02\pi$ or less, about $0.01\pi$ or less, about $0.005\pi$ or less, about $0.002\pi$ or less). $\lambda_1$ can be about 2,000 nm or less (e.g., about 1,500 nm or less, about 1,000 nm or less, about 500 nm or less). In some embodiments, $\lambda_1$ is about 150 nm or more (e.g., about 200 nm or more, about 300 nm or more, about 400 nm or more). In certain embodiments, $\lambda_1$ is about 780 nm and $\lambda_2$ is about 640 nm, while in other embodiments, $\lambda_1$ is about 1550 nm and $\lambda_2$ is about 1300 nm. In still other embodiments, $\lambda_1$ is about 780 nm and $\lambda_2$ is about 405 nm. In some embodiments, $\lambda_1$ is about 660 nm and $\lambda_2$ is about 405 nm. In certain embodiments, $\lambda_1$ is about 400 nm and $\lambda_2$ is about 300 nm.

The article can include a plurality of interstices interspersed between the walls. The interstices can have a width of about 20 nm or more (e.g., about 30 nm or more, about 50 nm or more, about 75 nm or more, about 100 nm or more). In some embodiments, the interstices have a width of about 500 nm or less (e.g., about 250 nm or less, about 125 nm or less, about 50 nm or less). In certain embodiments, the interstices have a width of between about 90 nm and about 110 nm.

The walls can have a width of about 30 nm or more (e.g., about 50 nm or more, about 100 nm or more, about 200 nm or more, about 300 nm or more). In some embodiments, the walls have a width of about 1,000 nm or less (e.g., about 500 nm or less, about 300 nm or less). In certain embodiments, the walls have a width of between about 200 nm and about 240 nm.

The grating can have a period of about 1,000 nm or less (e.g., about 750 nm or less, about 500 nm or less, about 400 nm or less, about 300 nm or less, about 200 nm or less, about 100 nm or less, about 50 nm or less). The grating can have a duty cycle of about 30% or more (e.g., about 40% or more, about 50% or more, about 60% or more, about 70% or more, about 80% or more).

The walls can have a depth of about 100 nm or more (e.g., about 200 nm or more, about 300 nm or more, about 500 nm or more, about 800 nm or more). In some embodiments, the walls have a depth of between about 850 nm and about 1,100 nm.

The layer of the first material in each portion can have a thickness of about 100 nm or more (e.g., about 200 nm or more, about 300 nm or more, about 500 nm or more). In certain embodiments, the layer of the first material in each portion has a thickness between about 700 nm and about 800 nm. The layer of the second material in each portion can have a thickness of about 20 nm or more (e.g., about 50 nm or more, about 100 nm or more, about 150 nm or more). In some embodiments, the layer of the second material in each portion has a thickness between about 150 nm and about 200 mm. In certain embodiments, the layer of the first material has a thickness of about 750 nm and the layer of the second material has a thickness of about 170 nm.

In some embodiments, the first material has a refractive index $n_1$ at $\lambda_1$ and the second material has a refractive index $n_2$ at $\lambda_1$, wherein $n_1$ is less than $n_2$. Alternatively, in certain embodiments, $n_1$ is greater than $n_2$. The first material can have a refractive index n, at $\lambda_1$ of about 1.6 or more (e.g., about 1.7 or more, about 1.8 or more, about 1.9 or more, about 2.0 or more, about 2.1 or more). The second material can have a refractive index $n_2$ at $\lambda_1$ of about 2.5 or less (e.g., about 2.0 or less, about 1.9 or less, about 1.8 or less, about 1.7 or less, about 1.6 or less, about 1.5 or less). In some embodiments, the first and second materials have refractive indexes $n_1$ and $n_2$ at $\lambda_1$, respectively, wherein $n_1$ is about 2.0 and $n_2$ is about 1.7.

The first material can be a semiconductor material, an electrically conducting material (e.g., a metal), or a dielectric material. The first material can include a material selected from the group consisting of $SiN_x:H_z$, $SiO_xN_y:H_z$, $Al_2O_3$, $Ta_2O_5$, $Nb_2O_5$, $TaNb_xO_y$, $TiNb_xO_y$, $HfO_2$, $TiO_2$, $SiO_2$, $ZnO$, $LiNbO_3$, a-Si, Si, ZnSe, and ZnS, where x, y, and z are integers. The second material can be a semiconductor material, an electrically conducting material (e.g., a metal), or a dielectric material. The second material can include a material selected from the group consisting of $SiN_x:H_z$, $SiO_xN_y:H_z$, $Al_2O_3$, $Ta_2O_5$, $Nb_2O_5$, $TaNb_xO_y$, $TiNb_xO_y$, $HfO_2$, $TiO_2$, $SiO_2$, $ZnO$, $LiNbO_3$, a-Si, Si, ZnSe, and ZnS, wherein x, y, and z are real numbers. In some embodiments, the first and/or second materials includes a polymer.

In certain embodiments, $\Gamma_1$ is about $\pi/4$. In some embodiments, $\Gamma_1$ is about $\pi/2$.

Each portion can further include a layer of a third material disposed on the layer of the second material, wherein the third material and the second materials are different. The third material can be different from the first material. The third material can be a dielectric material. The third material can include a material selected from the group consisting of $SiN_x:H_z$, $SiO_xN_y:H_z$, $Al_2O_3$, $Ta_2O_5$, $Nb_2O_5$, $TaNb_xO_y$, $HfO_2$, $TiO_2$, $SiO_2$, $ZnO$, $LiNbO_3$, a-Si, Si, ZnSe, and ZnS, where x, y, and z are real numbers. Each portion can further include one or more additional layers disposed on the layer of the third material. The article can include a substantially continuous layer of a third material disposed on the layer of the second material in each portion. The third material can be different from the first material. The third material can be a dielectric material. The third material can include a material selected from the group consisting of $SiN_x:H_z$, $SiO_xN_y:H_z$, $Al_2O_3$, $Ta_2O_5$, $Nb_2O_5$, $TaNb_xO_y$, $TiNb_xO_y$, $HfO_2$, $TiO_2$, $SiO_2$, $ZnO$, $LiNbO_3$, a-Si, Si, ZnSe, and ZnS, where x, y, and z are real numbers. The article can include a substantially continuous layer deposited on the third layer.

The article can include a substrate, wherein the plurality of walls are supported by the substrate. The article can also include a layer of an etch stop material disposed between the walls and the substrate, the etch stop material being substantially resistant to an etchant for the first material. In some embodiments, the article includes a first antireflection film arranged to reduce reflection of incident radiation at wavelength $\lambda_1$ propagating through the article. In certain embodiments, the article can also include a second antireflection film arranged to reduce reflection of incident radiation at wavelength $\lambda_1$ propagating through the article, wherein the first and second antireflection films are on opposite sides of the article.

The article can transmit about 90% or more incident radiation at wavelength $\lambda_1$ propagating through the article (e.g., about 95% or more). The article can transmit substantially the same percentage of incident radiation at wavelengths $\lambda_1$ and $\lambda_2$ propagating through the article. The article can transmit about 70% or more incident radiation at wavelengths $\lambda_1$ and $\lambda_2$ propagating through the article (e.g., about 90% or more, about 95% or more). The article can transmit substantially the same percentage of incident radiation at wavelengths $\lambda_1$ and $\lambda_2$ propagating through the article at incident angles from zero degrees to about three degrees or more relative to an optical axis of the article (e.g., about five degrees or more, about seven degrees or more, about 10 degrees or more, about 15 degrees or more, about 20 degrees or more, about 25 degrees or more). The article can transmit substantially the same percentage of incident radiation at wavelengths $\lambda_1$ and $\lambda_2$ propagating through the article at incident angles of about zero degrees, about 10 degrees, about 20 degrees, about 30 degrees, about 40 degrees, about 50 degrees, about 60 degrees, about 70 degrees, and/or about 80 degrees from a normal to a surface of the article.

In a further aspect, the invention features a system for reading information from an optical storage medium, the system including a laser having an emission wavelength $\lambda_1$, a detector, and a previously discussed article, wherein during operation the laser directs radiation at $\lambda_1$ to reflect from a surface of the optical storage medium and the detector detects the reflected radiation, wherein the radiation passes through the article at least once. The laser can emit radiation at a wavelength $\lambda_2$ different from $\lambda_1$. In certain embodiments, the article is configured to retard the phase of radiation at $\lambda_1$ by $\pi$. The system can further include a retarder positioned between the article and the optical storage medium, wherein the retarder is configured to retard the phase of radiation at $\lambda_1$ by $\pi/2$. In some embodiments, the article is configured to retard the phase of radiation at $\lambda_1$ by $\pi/2$. The system can include a retarder positioned between the laser and the article, wherein the retarder is configured to retard the phase of radiation at $\lambda_1$ by $\pi$. The system can include a polarizer positioned between the laser and the article.

In another aspect, the invention features a system, including a previously discussed article, and a polarizer, wherein the polarizer and article are configured so that during operation the polarizer substantially polarizes radiation of wavelength $\lambda_1$ propagating along the optical axis prior to the radiation being incident on the article.

Embodiments of the invention may include one or more of the following advantages.

In some embodiments, the article can be an optical retarder that is substantially achromatic over a range of wavelengths. Accordingly, devices and systems utilizing such articles can exhibit enhanced performance. As an example, a system used for reading an optical storage medium (e.g., a compact disc or digital versatile disc) can provide reduced signal noise and increased fidelity in reading the medium.

The details of one or more embodiments of the invention are set forth in the accompanying drawings and the description below. Other features and advantages of the invention will be apparent from the description and drawings, and from the claims.

DESCRIPTION OF DRAWINGS

FIGS. 3A–3D are cross-section views of an optical retarder during different phases of its fabrication.

Like reference symbols in the various drawings indicate like elements.

DETAILED DESCRIPTION

Figure 1:
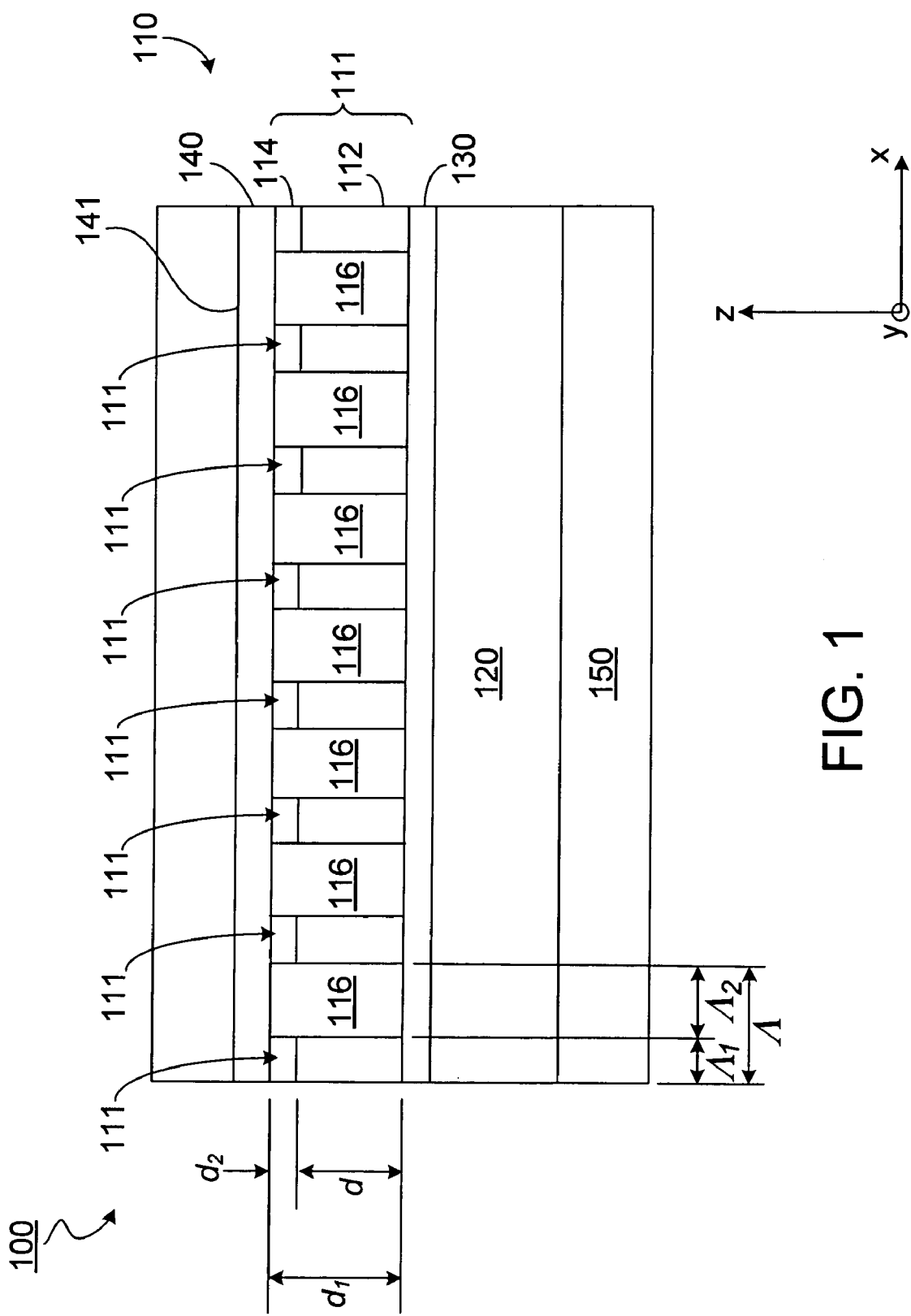
FIG. 1 is a cross-sectional view of an embodiment of an optical retarder.

Referring to FIG. 1, in some embodiments, an optical retarder 100 includes a grating 110 supported by a substrate 120, an etch stop layer 130 disposed on substrate 120, and a grating 110 disposed on etch stop layer 130. Optical retarder 100 also includes a cap layer 140, disposed on grating 110 on the side opposite etch stop layer 130. Antireflection films 150 and 160 are disposed on substrate 120 and cap layer 140, respectively. A Cartesian co-ordinate system is provided for reference.

Grating 110 includes a number of walls 111, which extend along the y-axis and have a thickness d in the z-direction. Walls 111 are periodically (or close to periodically) spaced in the x-direction, and are separated by spaces 116 that may be filled with a gas (e.g., air, nitrogen, or a noble gas) or evacuated. Each wall 111 is composed of a layer 112 of a first material and a layer 114 of a second material, which have thickness $d_1$ and $d_2$ in the z-direction, respectively. Each wall 111 has a width $\Lambda_1$ in the x-direction. The width of each space 116 in the x-direction is denoted $\Lambda_2$. Accordingly, grating 110 has a grating period of $\Lambda=\Lambda_1+\Lambda_2$ and a duty cycle of $100\% \times \Lambda_1/\Lambda$.

Grating 110 is form birefringent for radiation having wavelengths greater than $\Lambda$. In other words, different polarization states of radiation having wavelength $\lambda$ propagate through grating 110 with different phase shifts, which depend on the thickness of retardation layer 110, the index of refraction of layers 112 and 114 at $\lambda$, layer thickness $d_1$ and $d_2$, the index of refraction of spaces 116, and $\Lambda_1$ and $\Lambda_2$. Accordingly, these parameters can be selected to provide a desired amount of retardation to polarized light at a wavelength $\lambda$.

Retardation layer 110 has a birefringence, $\Delta n(\lambda)$, at wavelength $\lambda$, which corresponds to $n_e-n_o$, where $n_e$ and $n_o$ are the effective extraordinary and effective ordinary indexes of refraction for grating 110, respectively. The effective extraordinary index of refraction is the index of refraction experienced by radiation having its electric field polarized along the x-direction, while the effective ordinary index is the index of refraction experienced by radiation having its electric polarized along the y-direction. In general, the values of $n_e$ and $n_o$ depend on the thickness, $d_1$, and $d_2$, and indexes of refraction of layers 112, 114, the index of refraction of spaces 116, $\Lambda_1$ and $\Lambda_2$, and on the radiation wavelength, $\lambda$. In some embodiments, $\Delta n$ is relatively large (e.g., about 0.1 or more, about 0.15 or more, about 0.2 or more, about 0.3 or more, about 0.5 or more, about 1.0 or more, about 1.5 or more, about 2.0 or more). A relatively large birefringence can be desirable in embodiments where a high retardation and/or phase retardation are desired (see below), or where a thin grating is desired. Alternatively, in other embodiments, $\Delta n$ is relatively small (e.g., about 0.05 or less, about 0.04 or less, about 0.03 or less, about 0.02 or less, about 0.01 or less, about 0.005 or less, about 0.002 or less, 0.001 or less). A relatively small birefringence may be desirable in embodiments where a low retardation or phase retardation are desired, and/or where relatively low sensitivity of the retardation and/or phase retardation to variations in the thickness of grating 110 is desired.

The retardation of grating 110 is the product of the thickness of retardation layer 110, d, and $\Delta n$. By selecting appropriate values for $\Delta n$ and the d, the retardation can vary as desired. In some embodiments, the retardation of retardation layer 110 is about 50 nm or more (e.g., about 75 nm or more, about 100 nm or more, about 125 nm or more, about 150 nm or more, about 200 nm or more, about 250 nm or more, about 300 nm or more, about 400 nm or more, about 500 nm or more, about 1,000 or more, such as about 2,000 nm). Alternatively, in other embodiments, the retardation is about 40 nm or less (e.g., about 30 nm or less, about 20 nm or less, about 10 nm or less, about 5 nm or less, about 2 nm or less). In some embodiments, the retardation corresponds to $\lambda/4$ or $\lambda/2$.

Grating 110 also has a phase retardation, $\Gamma$, for each wavelength, which can be approximately determined according to $$\Gamma(\lambda) \approx \frac{2\pi}{\lambda} \cdot \sum_{j=1,2} \Delta n_j(\lambda) \cdot d_j, \qquad (1)$$

where $d_j$, j=1,2 are the thickness of layers 112 and 114, respectively. This equation can be used to calculate the approximate phase retardation for gratings that include any number of layers by extending the sum of $\Delta n_j(\lambda) \cdot d_j$ over all the layers.

Quarter wave phase retardation is given, for example, by $\Gamma=\pi/2$, while half wave phase retardation is given by $\Gamma=\pi$. In general, phase retardation may vary as desired, and is generally selected based on the end use application of optical retarder 100. In some embodiments, phase retardation may be about $2\pi$ or less (e.g., about $\pi$ or less, about $0.8\pi$ or less, about $0.7\pi$ or less, about $0.6\pi$ or less, about $0.5\pi$ or less, about $0.4\pi$ or less, about $0.2\pi$ or less, $0.2\pi$ or less, about $0.1\pi$ or less, about $0.05\pi$ or less, $0.01\pi$ or less). Alternatively, in other embodiments, phase retardation of retardation layer 110 can be more than $2\pi$ (e.g., about $3\pi$ or more, about $4\pi$ or more, about $5\pi$ more).

In general, the retardation and phase retardation of grating 110 varies with wavelength, as indicated in Eq. (1). In addition to the explicit $\lambda^{-1}$ dependence of $\Gamma$ on $\lambda$, $\Gamma$ also depends on $\lambda$ because $\Delta n$ varies with $\lambda$. For certain embodiments, grating 110 can be designed so that $\Delta n$ is approximately proportional to $\lambda$ over a range of wavelengths, $\Delta\lambda$. For these embodiments, $\Gamma$ is substantially constant for the range of wavelengths, $\Delta\lambda$. Accordingly, in some embodiments, the composition of grating 110 is selected to provide achromatic retardation over a range of wavelengths. In other words, the grating is substantially achromatic over the range of wavelengths, and retards the phase of each wavelength in the range $\Delta\lambda$ by substantially the same amount.

Figure 2:
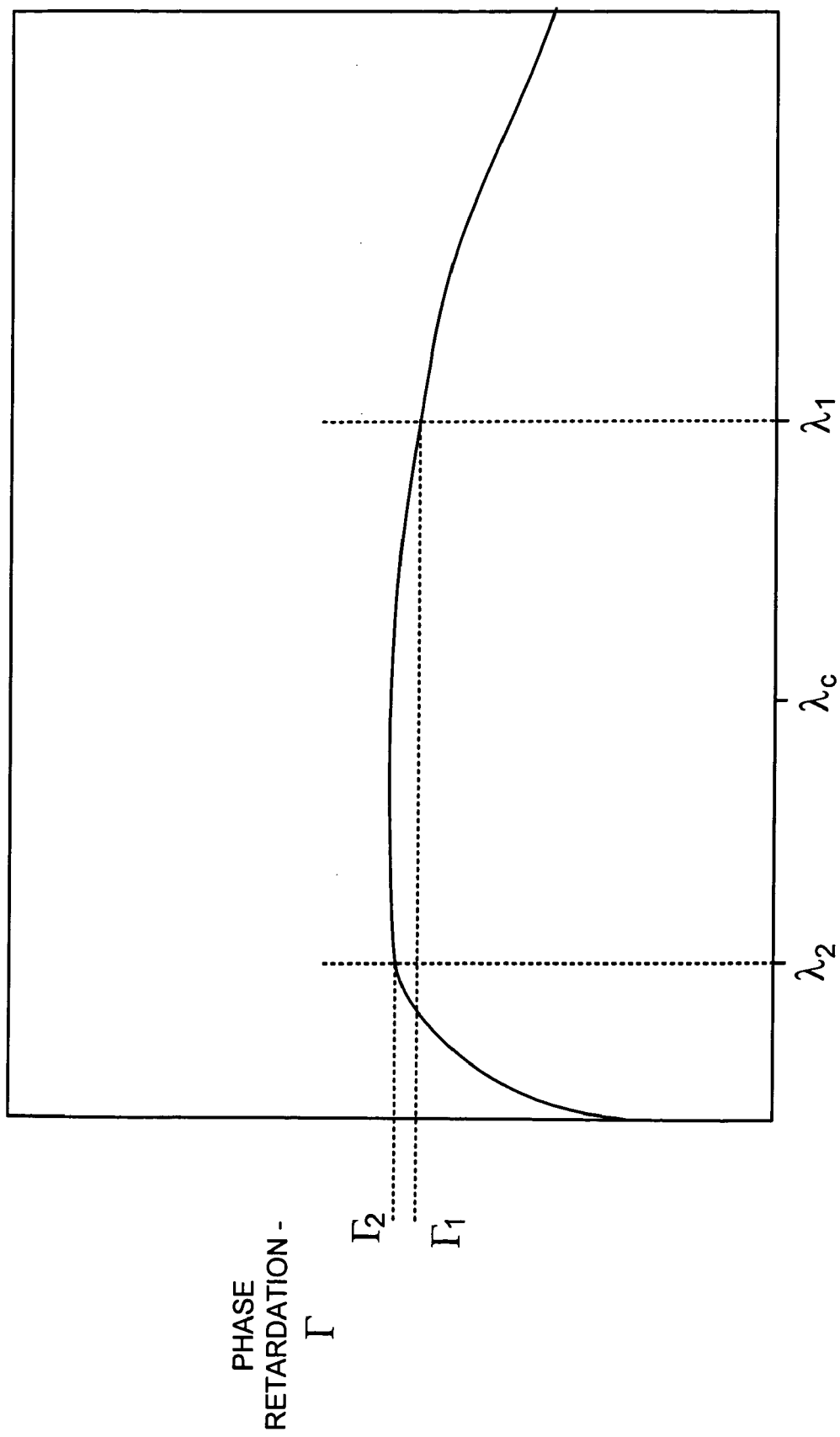
FIG. 2 is a plot of retardation versus wavelength for an achromatic optical retarder.

Referring to FIG. 2, for some embodiments, constant phase retardation of grating 110 over a range of wavelengths is illustrated in a plot showing phase retardation, $\Gamma$, as a function of wavelength, $\lambda$. At a first wavelength $\lambda_1$, grating 110 has a phase retardation $\Gamma_1$, while at a second wavelength, $\lambda_2$, grating 110 has a phase retardation $\Gamma_2$, where $\Gamma_1 \sim \Gamma_2$. For example, in some embodiments, $|\Gamma_1 - \Gamma_2|$ is about $0.05\pi$ or less, about $0.03\pi$ or less, about $0.02\pi$ or less, about $0.017\pi$ or less, about $0.005\pi$ or less, $0.001\pi$ or less. In certain embodiments, $\Gamma_1$ and $\Gamma_2$ vary by about 10% or less (e.g., about 8% or less, about 5% or less, about 4% or less, about 3% or less, about 2% or less, about 1% or less).

Moreover, values of $\Gamma$ for wavelengths in the range $\Delta\lambda$ are substantially constant. For example, $\Gamma$ for any wavelength $\lambda'$ in the range $\Delta\lambda$ can vary from $\Gamma_1$ by about $0.05\pi$ or less, about $0.03\pi$ or less, about $0.02\pi$ or less, about $0.01\pi$ or less, about $0.005\pi$ or less, $0.001\pi$ or less. In some embodiments, $\Gamma$ varies by about 10% or less over the range $\Delta\lambda$ (e.g., by about 8% or less, by about 5% or less, by about 4% or less, by about 3% or less, by about 2% or less, by about 1% or less) for a range of wavelengths that is about 20 nm or more (e.g., about 30 nm or more, about 40 nm or more, about 50 nm or more, about 60 nm or more, about 70 nm or more, about 100 nm or more, about 200 nm or more, about 300 nm or more, about 500 nm or more, about 1,000 nm or more).

The location of $\Delta\lambda$ in the electromagnetic spectrum can be designated by a central wavelength, $\lambda_c$, which is given by $\frac{1}{2}(\lambda_1+\lambda_2)$. In general, $\lambda_c$ can vary as desired, and is typically selected based on the end use application of optical retarder 100. For example, in telecommunication applications that use infrared radiation, $\lambda_c$ can be between about 800 nm and 2,000 mm (e.g., between about 900 nm and about 1,000 nm, or from about 1,300 nm and 1,600 nm). As another example, where optical retarder 100 is used in an optical memory device (e.g., a compact disc (CD) or digital versatile disc (DVD) device), $\lambda_c$ can be in the visible portion or near-infrared portion of the electromagnetic spectrum (e.g., from about 400 mm to about 850 nm). As another example, where optical retarder 100 is used as a component in a lithography exposure apparatus, $\lambda_c$ is typically in the ultraviolet portion of the spectrum (e.g., from about 150 nm to about 400 nm).

Various metrics can be used to characterize the phase retardation spectrum of a retarder, including, for example, the spectral flatness and integrated spectral flatness of the spectrum, and the dispersion slope of the phase retardation spectrum.

Spectral flatness, $\Delta$, of a retarder is given by:

$$\Delta = 2 \cdot \left[ \frac{\Gamma(\lambda_1) - \Gamma(\lambda_2)}{\Gamma(\lambda_1) + \Gamma(\lambda_2)} \right] \times 100\%, \tag{2}$$

and is related to the variation of a retarder's phase retardation at $\lambda_1$ and $\lambda_2$. In some embodiments, $\Delta$ can be relatively small. For example, $\Delta$ can be about 10% or less (e.g., about 8% or less, about 5% or less, about 3% or less, about 2% or less) for $|\lambda_1 - \lambda_2|$ of about 20 nm or more (e.g., about 50 nm or more, about 100 nm or more, about 200 nm or more).

Integrated spectral flatness, $\sigma$, is given by $$\sigma = \left\{ \frac{1}{\lambda_2 - \lambda_1} \int_{\lambda_1}^{\lambda_2} [\Gamma(\lambda)/\overline{\Gamma} - 1]^2 d\lambda \right\}^{1/2} \text{ where} \tag{3}$$

$$\overline{\Gamma} = \frac{1}{\lambda_2 - \lambda_1} \int_{\lambda_1}^{\lambda_2} \Gamma(\lambda) \cdot d\lambda. \tag{4}$$

Integrated spectral flatness is related to the variation of a retarder's phase retardation over the range of wavelengths from $\lambda_1$ to $\lambda_2$. In certain embodiments, $\sigma$ can be relatively small. For example, $\sigma$ can be about 10% or less (e.g., about 8% or less, about 5% or less, about 3% or less, about 2% or less) for $|\lambda_1 - \lambda_2|$ of about 20 nm or more (e.g., about 50 nm or more, about 100 nm or more, about 200 nm or more).

Another parameter that can be used to characterize a retarder from its phase retardation spectrum is the dispersion slope, $k_D$, which is related to a linear component of the retarder's phase retardation spectrum over a spectral range defined by $\lambda_1$ and $\lambda_2$. $k_D$ can be determined as a fit parameter B for a minimum value of $\epsilon$ given by the equation $$\varepsilon(B, C; \lambda_c) = \left[ \frac{1}{\lambda_2 - \lambda_1} \int_{\lambda_1}^{\lambda_2} \left( \frac{\Gamma(\lambda)}{\Gamma(\lambda_c)} - B \cdot \frac{\lambda_c}{\lambda} - C \right)^2 d\lambda \right]^{\frac{1}{2}}, \text{ where} \tag{5}$$

$$\lambda_c = \frac{\lambda_1 + \lambda_2}{2} \tag{6}$$

and C is another fitting parameter. A small value of $k_D$ can be indicative of a high degree of achromaticity in the retarder's performance over the spectral range from $\lambda_1$ to $\lambda_2$.

The linearity of a retarder's phase retardation spectrum is related to $\epsilon^2$ when is minimized. A value of $\epsilon^2$ close to unity indicates a substantially linear phase retardation over the range $\lambda_1$ to $\lambda_2$, while a value of $\epsilon^2$ close to zero indicates substantial non-linearity. In some embodiments, $\epsilon^2$ can be about 0.8 or more (e.g., about 0.9 or more, about 0.95 or more, about 0.97 or more, about 0.98 or more, about 0.99 or more) for $|\lambda_1 - \lambda_2|$ of about 20 nm or more (e.g., about 50 nm or more, about 100 nm or more, about 200 nm or more).

In general, the thickness of each layer in grating 110, widths $\Lambda_1$ and $\Lambda_2$, and the refractive indexes of the materials forming layers 112 and 114 are selected to provide desired retardation over wavelength range for one or more wavelengths in the range $\Delta\lambda$. The value for each of these parameters can be determined using computer modeling techniques. For example, in some embodiments, the structure of grating 110 can be determined using a computer-implemented algorithm that varies one or more of the grating parameters until the grating design provides the desired retardation values at the wavelengths of interest. One model that can be used is referred to as "rigorous coupled-wave analysis" (RCWA), which solves the governing Maxwell equations of the gratings. RCWA can be implemented in a number of ways. For example, one may use commercial software, such as GSolver, from Grating Development Company (GDC) (Allen, Tex.), to evaluate and the grating structure for transmissions and reflections. Alternatively, or additionally, RCWA can be implemented to calculate the relative phase shift among different polarization states. One or more optimization techniques such as, for example, direct-binary search (DBS), simulated annealing (SA), constrained global optimization (CGO), simplex/multiplex, may be used in combination with the RCWA to determine the structure of grating 110 that will provide desired optical performance. Optimization techniques are described, for example, in Chapter 10 of "Numerical Recipes in C, the Art of Scientific Computing," by W. H. Press et al., University of Cambridge Press, $2^{nd}$ Ed. (1992). Examples of implementations of RCWA are described by L. Li in "Multilayer modal method for diffraction gratings of arbitrary profile, depth, and permittivity," *J. Opt. Soc. Am. A*, Vol. 10, No. 12, p. 2581 (1993) and by T. K. Gaylord and M. G. Moharam in "Analysis and applications of optical diffraction gratings," *Proc. IEEE*, Vol. 73, No. 5 (1985).

Alternatively, or additionally, effective media theory (EMT) can be used to determine the approximate phase of radiation at various wavelengths that traverses grating 110 for different values of parameters associated with grating 110's structure. Implementations of EMT are described, for example, by H. Kikuta et al., in "Achromatic quarter-wave plates using the dispersion of form birefringence," *Applied Optics*, Vol. 36, No. 7, pp. 1566–1572 (1997), by C. W. Haggans et al., in "Effective-medium theory of zeroth order lamellar gratings in conical mountings," *J. Opt. Soc. Am. A*, Vol. 10, pp 2217–2225 (1993), and by H. Kikuta et al., in "Ability and limitations of effective medium theory for subwavelength gratings," *Opt. Rev.*, Vol. 2, pp. 92–99 (1995).

The thickness, d, of grating 110 measured along the z-axis can vary as desired. In general, the thickness of layer 110 is selected based to provide a desired amount of retardation and/or phase retardation for radiation at one or more wavelengths of interest. For a grating with a given birefringence, a larger grating thickness will provide a larger value for the retardation and/or phase retardation. In some embodiments, d can be about 50 nm or more (e.g., about 75 nm or more, about 100 nm or more, about 125 nm or more, about 150 nm or more, about 200 nm or more, about 250 nm or more, about 300 nm or more, about 400 nm or more, about 500 nm or more, about 1,000 nm or more, such as about 2,000 nm).

The thickness of layer 112 and 114 can also vary. These thicknesses are also selected so grating 110 provides a desired amount of retardation and/or phase retardation at one or more wavelengths. In general, thickness $d_1$ can be the same or different as thickness $d_2$. $d_1$ and/or $d_2$ can be less than or greater than $\lambda$. For example, $d_1$ and/or $d_2$ can be about $0.1 \lambda$ or more (e.g., about $0.2 \lambda$ or more, about $0.3 \lambda$ or more, about $0.5 \lambda$ or more, about $0.8 \lambda$ or more, about $1 \lambda$ or more, about $1.5 \lambda$ or more, such as about $2 \lambda$ or more). In certain embodiments, $d_1$ can be about 50 nm or more (e.g., about 75 nm or more, about 100 nm or more, about 125 nm or more, about 150 nm or more, about 200 nm or more, about 250 nm or more, about 300 nm or more, about 400 nm or more, about 500 nm or more, about 750 nm or more, such as about 1,000 nm). In some embodiments, $d_2$ can be about 50 nm or more (e.g., about 75 nm or more, about 100 nm or more, about 125 nm or more, about 150 nm or more, about 200 nm or more, about 250 nm or more, about 300 nm or more, about 400 nm or more, about 500 nm or more, about 750 nm or more, such as about 1,000 nm).

The aspect ratio of grating thickness (in the z-direction), d, to $\Lambda_1$ and/or d to $\Lambda_2$ can be relatively high. For example d:$\Lambda_1$ and/or d:$\Lambda_2$ can be about 2:1 or more (e.g., about 3:1 or more, about 4:1 or more, about 5:1 or more, about 8:1 or more, about 10:1 or more).

In general, $\Lambda_1$ can be about $0.2 \lambda$ or less (e.g., about $0.1 \lambda$ or less, about $0.05 \lambda$ or less, about $0.04 \lambda$ or less, about $0.03 \lambda$ or less, about $0.02 \lambda$ or less, $0.01 \lambda$ or less). For example, in some embodiments, $\Lambda_1$ is about 200 nm or less (e.g., about 150 nm or less, about 100 nm or less, about 80 nm or less, about 70 nm or less, about 60 nm or less, about 50 nm or less, about 40 nm or less, about 30 nm or less). Similarly, $\Lambda_2$ can be about $0.2 \lambda$ or less (e.g., about $0.1 \lambda$ or less, about $0.05 \lambda$ or less, about $0.04 \lambda$ or less, about $0.03 \lambda$ or less, about $0.02 \lambda$ or less, $0.01$ k or less). For example, in some embodiments, $\Lambda_2$ is about 200 nm or less (e.g., about 150 nm or less, about 100 nm or less, about 80 nm or less, about 70 nm or less, about 60 nm or less, about 50 nm or less, about 40 nm or less, about 30 nm or less). $\Lambda_1$ and $\Lambda_2$ can be the same as each other or different.

In general, $\Lambda$ is less than $\lambda$, such as about $0.5 \lambda$ or less (e.g., about $0.3 \lambda$ or less, about $0.2 \lambda$ or less, about $0.1 \lambda$ or less, about $0.08 \lambda$ or less, about $0.05 \lambda$ or less, about $0.04 \lambda$ or less, about $0.03 \lambda$ or less, about $0.02 \lambda$ or less, $0.01$ ? or less). In some embodiments, $\Lambda$ is about 500 nm or less (e.g., about 300 nm or less, about 200 nm or less, about 100 nm or less, about 80 nm or less, about 60 nm or less, about 50 nm or less, about 40 nm or less).

In general, the materials used to form layers 112 and 114 can vary. Materials are usually selected based on their refractive index at the wavelengths of interest. Typically, the material forming layer 112 will have a different refractive index to the material forming layer 114 at one or more wavelengths of interest. In some embodiments, materials with a relatively high refractive index are used. For example, materials can have a refractive index of about 1.8 or more (e.g., about 1.9 or more, about 2.0 or more, about 2.1 or more, about 2.2 or more, about 2.3 or more). Examples of materials with a relatively high refractive index include $TiO_2$, which has a refractive index of about 2.35 at 632 nm, or $Ta_2O_5$, which has a refractive index of 2.15 at 632 nm.

Alternatively, or additionally, one or both of layers 112 and 114 can be formed from materials with a relatively low refractive index (e.g., about 1.7 or less, about 1.6 or less, about 1.5 or less). Examples of low index materials include $MgF_2$, $SiO_2$ and $Al_2O_3$, which have refractive indexes of about 1.37, 1.45 and 1.65 at 632 nm, respectively. Various polymers can also have relatively low refractive index (e.g., from about 1.4 to about 1.7)

In some embodiments, the composition of layers 112 and/or layers 114 have a relatively low absorption at wavelengths of interest, so that grating 110 has a relatively low absorption at those wavelengths. For example, grating 110 can absorb about 5% or less of radiation at wavelengths in the range $\Delta\lambda$ propagating along the z-axis (e.g., about 3% or less, about 2% or less, about 1% or less, about 0.5% or less, about 0.2% or less, about 0.1% or less).

In general, layers 112 and/or 114 can include inorganic and/or organic materials.

Examples of inorganic materials include metals, semiconductors, and inorganic dielectric materials (e.g., glass, $SiN_x$). Examples of organic materials include polymers.

In some embodiments, layers 112 and/or portions 114 include one or more dielectric materials, such as dielectric oxides (e.g., metal oxides), fluorides (e.g., metal fluorides), sulphides, and/or nitrides (e.g., metal nitrides). Examples of oxides include $SiO_2$, $Al_2O_3$, $Nb_2O_5$, $TiO_2$, $ZrO_2$, $HfO_2$, $SnO_2$, $ZnO$, $ErO_2$, $Sc_2O_3$, and $Ta_2O_5$. Examples of fluorides include $MgF_2$. Other examples include ZnS, $SiN_x$, $SiO_yN_x$, AlN, TiN, and HfN.

Layers 112 and/or layers 114 can be formed from a single material or from multiple different materials (e.g., composite materials, such as nanocomposite materials).

Layers 112 and/or layers 114 can include crystalline, semi-crystalline, and/or amorphous portions. Typically, an amorphous material is optically isotropic and may transmit light better than portions that are partially or mostly crystalline. As an example, in some embodiments, both layers 112 and 114 are formed from amorphous materials, such as amorphous dielectric materials (e.g., amorphous $TiO_2$ or $SiO_2$). Alternatively, in certain embodiments, layers 112 are formed from a crystalline or semi-crystalline material (e.g., crystalline or semi-crystalline Si), while layers 114 are formed from an amorphous material (e.g., an amorphous dielectric material, such as $TiO_2$ or $SiO_2$).

While grating 110 is shown as having eight walls, in general, the number of walls in a grating may vary as desired. The number of walls depends on the period, Λ, and the operational area required by the retardation component's end use application. In some embodiments, grating 110 can have about 50 or more portions (e.g., about 100 or more portions, about 500 or more portions, about 1,000 or more portions, about 5,000 or more portions, about 10,000 or more portions, about 50,000 or more portions, about 100,000 or more portions, about 500,000 more portions).

Moreover, while walls 111 include two layers, in general, walls in the grating 110 can include more than two layers (e.g., three or more layers, four or more layers, five or more layers, six or more layers). The number of layers in that walls are typically selected so that grating 110 provides a desired retardation at one or more wavelengths of interest.

Referring now to other layers in optical retarder 100, in general, substrate 120 provides mechanical support to optical retarder 100. In certain embodiments, substrate 120 is transparent to light at wavelength $\lambda_1$ and $\lambda_2$, transmitting substantially all light impinging thereon at wavelengths $\lambda_1$ and $\lambda_2$ (e.g., about 90% or more, about 95% or more, about 97% or more, about 99% or more, about 99.5% or more).

In general, substrate 120 can be formed from any material compatible with the manufacturing processes used to produce retarder 100 that can support the other layers. In certain embodiments, substrate 120 is formed from a glass, such as BK7 (available from Abrisa Corporation), borosilicate glass (e.g., pyrex available from Corning), aluminosilicate glass (e.g., C1737 available from Corning), or quartz/fused silica. In some embodiments, substrate 120 can be formed from a crystalline material, such as a non-linear optical crystal (e.g., $LiNbO_3$ or a magneto-optical rotator, such as garnet) or a crystalline (or semicrystalline) semiconductor (e.g., Si, InP, or GaAs). Substrate 120 can also be formed from an inorganic material, such as a polymer (e.g., a plastic). Substrates can also be a metal or metal-coated substrate.

Etch stop layer 130 is formed from a material resistant to etching processes used to etch the material(s) from which walls 111 are formed (see discussion below). The material(s) forming etch stop layer 130 should also be compatible with substrate 120 and with the materials forming grating 110. Examples of materials that can form etch stop layer 130 include $HfO_2$, $SiO_2$, $Al_2O_3$, $Ta_2O_5$, $TiO_2$, $SiN_x$, or metals (e.g., Cr, Ti, Ni).

The thickness of etch stop layer 130 in the z-direction can vary as desired. Typically, etch stop layer 130 is sufficiently thick to prevent significant etching of substrate 120, but should not be so thick as to adversely impact the optical performance of optical retarder 100. In some embodiments, etch stop layer is about 500 nm or less thick (e.g., about 250 nm or less, about 100 nm or less, about 75 nm or less, about 50 nm or less, about 40 nm or less, about 30 nm or less, about 20 nm or less).

Cap layer 140 covers spaces 116 and provides a smooth surface 141 onto which antireflection film 160 can be deposited. In general, the thickness along the z-direction and composition of cap layer 140 can vary as desired, and are typically selected so that the layer provides its mechanical function without substantially adversely affecting the optical performance of retarder 100. In some embodiments, cap layer 140 is about 50 nm or more thick (e.g., about 70 nm or more, about 100 nm or more, about 150 nm or more, about 300 nm or more thick). Cap layer can be formed from dielectric materials, such as dielectric oxides (e.g., metal oxides), fluorides (e.g., metal fluorides), sulphides, and/or nitrides (e.g., metal nitrides), such as those listed above.

Antireflection films 150 and 160 can reduce the reflectance of radiation at one or more wavelengths of interest impinging on and exiting optical retarder 100. Antireflection film 150 and 160 generally include one or more layers of different refractive index. As an example, one or both of antireflection films 150 and 160 can be formed from four alternating high and low index layers. The high index layers can be formed from $TiO_2$ or $Ta_2O_5$ and the low index layers can be formed from $SiO_2$ or $MgF_2$. The antireflection films can be broadband antireflection films or narrowband antireflection films.

In some embodiments, optical retarder 100 has a reflectance of about 5% or less of light impinging thereon at wavelength $\lambda_1$ and/or $\lambda_2$ (e.g., about 3% or less, about 2% or less, about 1% or less, about 0.5% or less, about 0.2% or less). Furthermore, optical retarder 100 can have high transmission of light of wavelength $\lambda_1$ and/or 2. For example, optical retarder can transmit about 95% or more of light impinging thereon at wavelength $\lambda_1$ and/or $\lambda_2$ (e.g., about 96% or more, about 97% or more, about 98% or more, about 99% or more, about 99.5% or more).

Optical retarder 100 can be formed using methods commonly used to fabricate microelectronic components, including a variety of deposition and lithographic patterning techniques. Steps of an exemplary process for forming optical retarder 100 is shown in FIG. 3A–3D. Referring specifically to FIG. 3A, in a first step, layer 130 of etch stop material is deposited on a surface 121 of substrate 120. A variety of deposition methods can be used for depositing layer 130 and for depositing additional layers as described below, including for example, vapor deposition methods, (e.g., chemical vapor deposition (CVD), such as plasma enhanced CVD), evaporation methods (e.g., electron beam or thermal evaporation methods), or sputtering, or atomic layer deposition (ALD).

Referring to FIG. 3B, additional layers are then deposited on surface 131 of etch stop layer 130. In particular, a continuous layer 112A of a first material is deposited onto surface 131, and then a continuous layer 114A of a second material is deposited on a surface of continuous layer 112A. Finally, a continuous layer 140A of another material is deposited on a surface of continuous layer 114A. The thickness of layer 112A and 114A correspond to the desired thickness of layers 112 and 114, respectively. Each of layers 112A, 114A, and 140A can be deposited by the deposition techniques listed above, for example.

Referring to FIG. 3C, portions of layers 112A, 114A, and 140A are etched to form walls 111A including layers 112, 114, and 140B. Prior to etching, a patterned layer of one or more polymers, such as a resist, is formed on surface 141 of layer 140A. The patterned layer can be formed using lithographic techniques such as, for example, nanoimprint lithography, holographic lithography, electron beam lithography, X-ray lithography or photolithography. Once the patterned layer has been formed, portions of layers 112A, 114A, and 140A can be etched by, for example, reactive ion etching (RIE), plasma etching, or wet etching. The etched portions of layers 112A, 114A, and 140A form walls 111A, as shown in FIG. 3C. The etched portions are depicted as spaces 116A. After etching, residual photoresist is removed from walls 111A and cap layer 140 is then formed by depositing material on top of walls 111A. By depositing material on walls 111A at an oblique angle with respect to the z-axis (e.g., using electron beam evaporation), a layer of material can be formed which covers spaces 116A without substantially filling the spaces with deposited material. In some embodiments, CVD methods, e.g., plasma enhanced CVD, can be used to cap the gratings.

Referring to FIG. 3D, the oblique deposition step results in a continuous cap layer 140, covering layers 114 of walls 111, while leaving spaces 116 substantially vacant of deposited material. A small amount of deposited material can fill in the uppermost portion of the spaces, including layers 140B within continuous cap layer 140. Layer 140 can be substantially homogeneous in embodiments where the material forming layer 140A and the obliquely deposited material are the same.

While the fabrication steps shown in FIGS. 3A–3D relate to a subtractive fabrication process (i.e., a process where continuous layers are formed and subsequently etched to form walls), alternatively, or additionally, additive fabrication steps can also be used. In an additive step, a patterned layer of sacrificial material is formed on a substrate surface prior to depositing a material that forms part of the wall. Material deposited on the patterned layer forms a discontinuous layer, with material being deposited on portions of the substrate surface exposed through the patterned layer, and also being deposited on the remaining portions of the sacrificial material. Cleaning the substrate in a way that removes the sacrificial material leaves behind the portions of material deposited directly onto the substrate surface, and removes material deposited onto the sacrificial material. Additive fabrication steps can be repeated to build up the walls.

While various optical retarders have been described, other embodiments are also possible. For example, in some embodiments, material can be deposited within spaces 116, resulting in a filled or partially filled grating. Typically, a material deposited within spaces 116 should have a different refractive index (e.g., at $\lambda_1$ and/or $\lambda_2$) than one or more of the materials forming walls 111 to maintain the optical grating. Examples of optical retarders with filled or partially filled gratings are described, for example, in U.S. patent application Ser. No. 10/866,416, entitled "OPTICAL FILMS AND METHODS OF MAKING THE SAME," filed on Jun. 11, 2004, the entire contents of which are hereby incorporated by reference. Similar to the components described in U.S. patent application Ser. No. 10/866,416, spaces 116 can be filled using deposition techniques like ALD.

Figure 4:
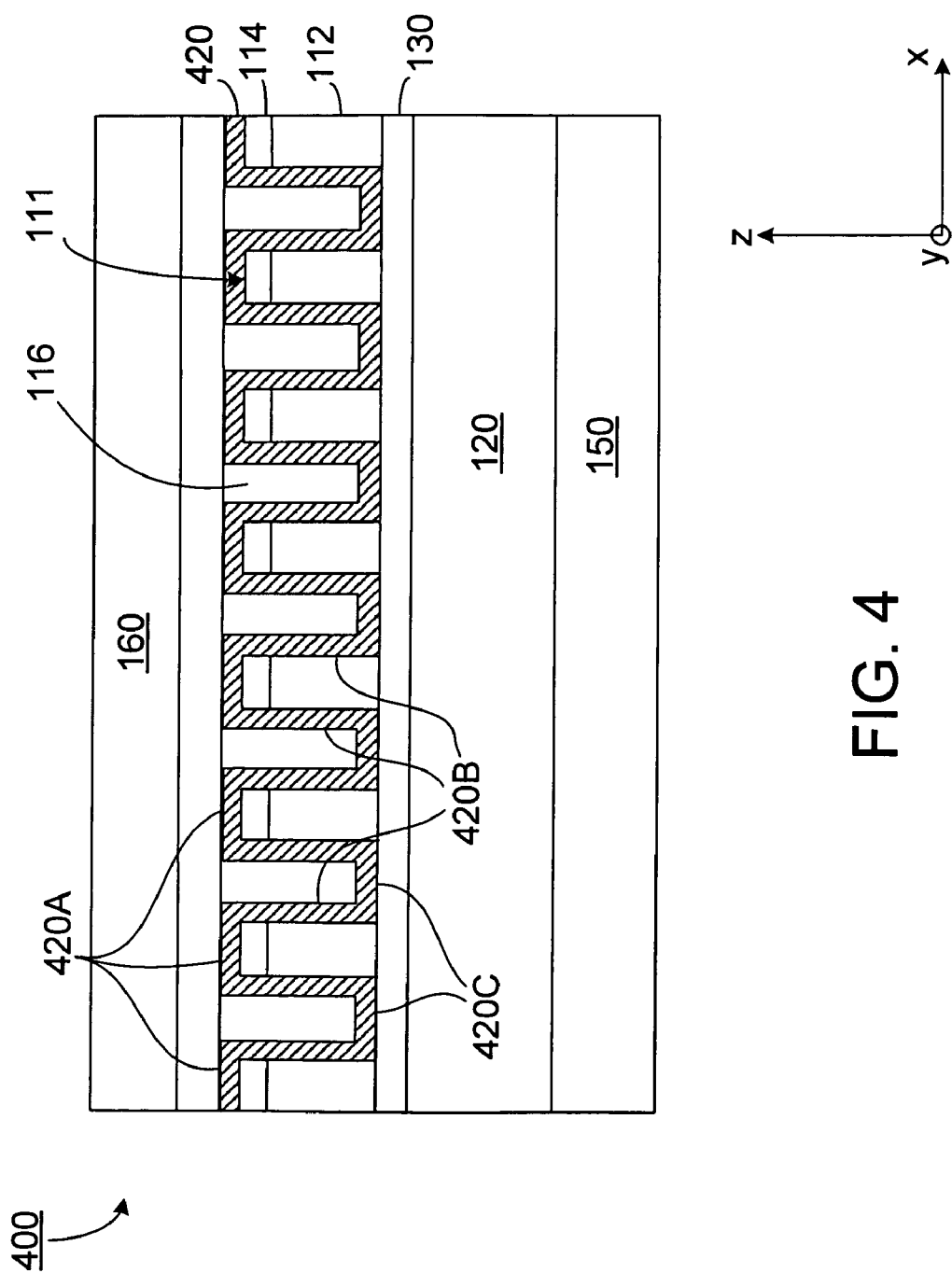
FIG. 4 is a cross-sectional view of a further embodiment of an optical retarder.

Furthermore, in some embodiments, material can be deposited within spaces 116 without filling the entire space between each wall. For example, in certain embodiments, one or more conformal layers can be deposited within space 116, providing an additional layer to each wall along the z-direction as well as layers of material in the x-direction. Referring to FIG. 4, as an example, an optical retarder 400 includes a single conformal layer 420 covering walls 111 and filling part of spaces 116. Conformal layer 420 includes contiguous portions 420A, 420B, and 420C, which are between walls 111 and cap layer 140, between walls 111 and spaces 116, and adjacent etch stop layer 130, respectively.

Conformal layer 420 can be formed from the same or different materials as layers 112 and/or 114. In some embodiments, conformal layer 420 is formed from a dielectric material, such as those listed previously. Alternatively, in certain embodiments, conformal layer 420 can be formed from a semiconductor material or a conducting material (e.g., a conducting metal).

As for layers 112 and 114, the thickness and composition of conformal layer 420 are selected so that optical retarder 400 meets certain optical specifications, such as a specific retardation at $\lambda_1$ and/or $\lambda_2$.

While optical retarder 400 includes only a single conformal layer, in general, optical retarders can include more than one conformal layer (e.g., two or more, three or more, four or more, five or more conformal layers).

Figure 5:
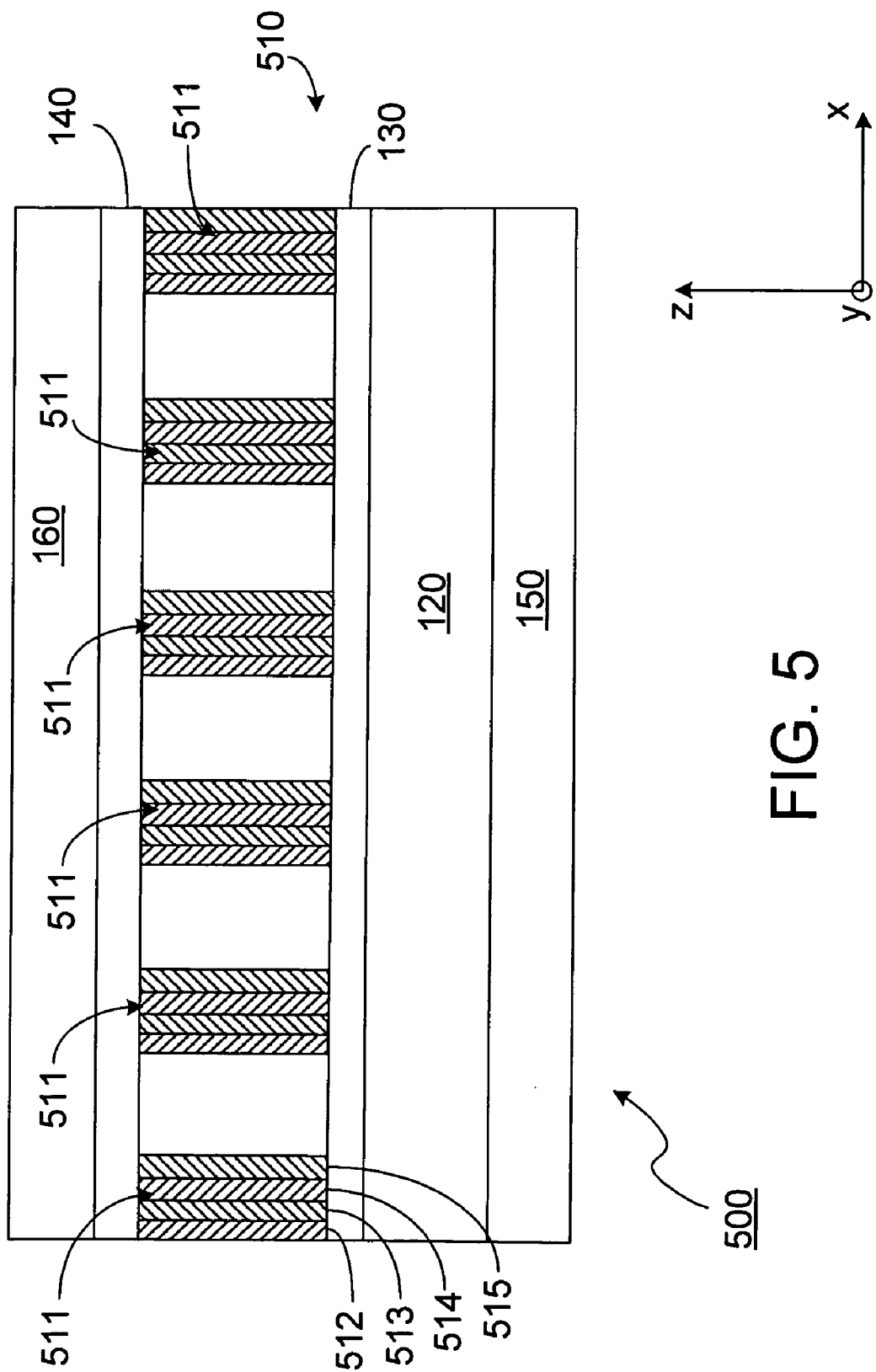
FIG. 5 is a cross-sectional view of another embodiment of an optical retarder.

In some embodiments, an optical retarder can include walls that are layered in the x-direction only. For example, referring to FIG. 5, an optical retarder 500 includes a grating 510 that has walls 511 that each includes four layers (i.e., layers 512, 513, 514, and 515) in the x-direction. Grating layer 510 can be prepared, for example, by forming a wall a number of conformal layers on a wall using ALD, and then etching the portions on each layer in the x-y plane using, for example, RIE.

While embodiments of optical retarders having substantially constant phase retardation over a range of wavelengths have been described, other embodiments can include optical retarders that have a retardation that varies with a specific functional dependence with respect to wavelength. For example, gratings can be designed to provide an optical retarder with linear wavelength dependence over a range of wavelengths.

Moreover, while the gratings in the described embodiments have a rectangular profile, in general, the grating can have other profiles. For example, the grating may have a sinusoidal, triangular, trapezoidal (e.g., tapered), or sawtooth profile.

Figure 11:
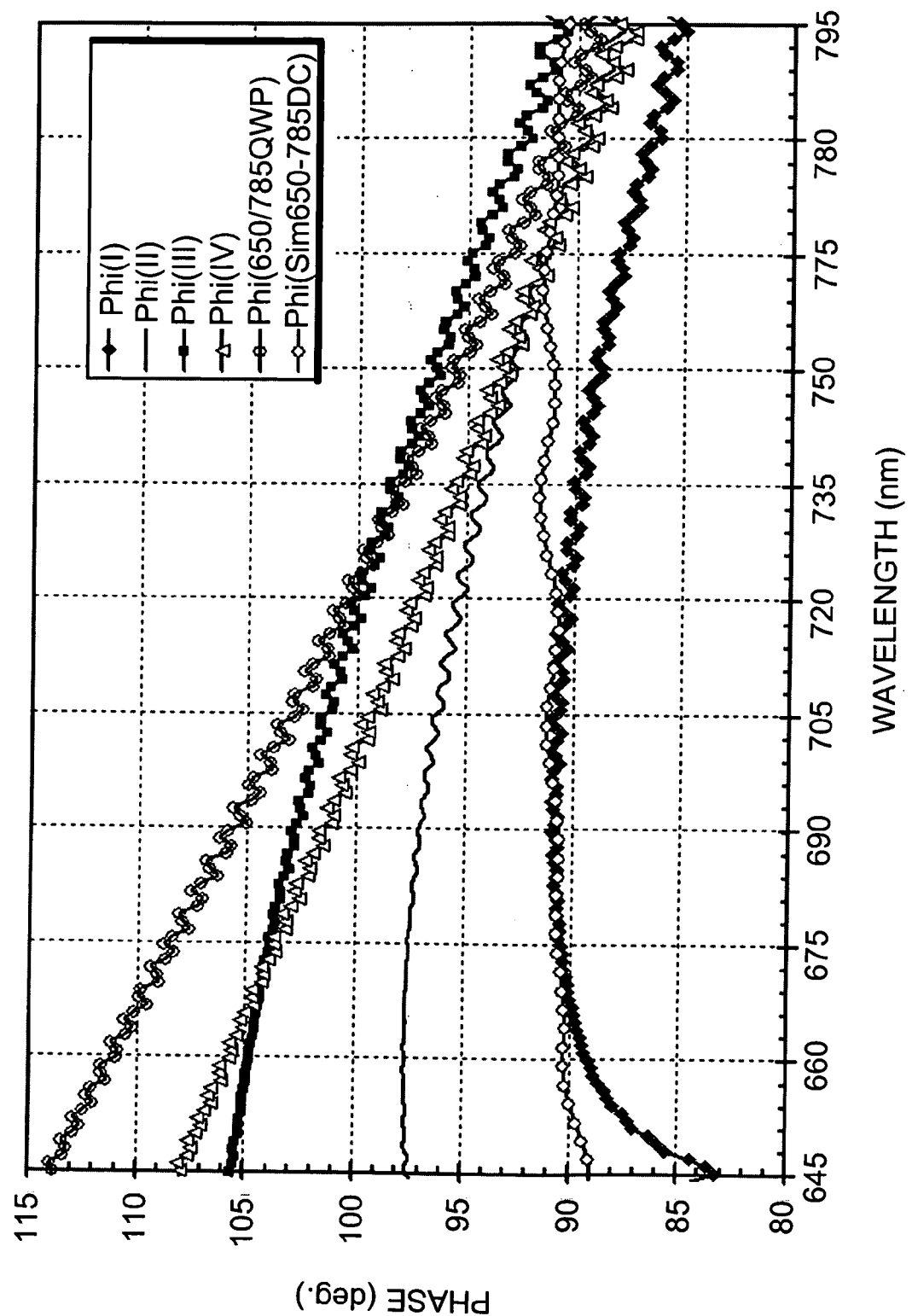
FIG. 11 is a plot of phase retardation versus wavelength for six embodiments of optical retarders.

Referring to FIG. 11, the phase retardation spectra for six different retarders is shown. The data in these spectra were obtained using RCWA. The phase retardation spectrum labeled "Phi(I)" corresponds to a tapered, trapezoidal grating having a duty cycle of 70% at the bottom (i.e., adjacent the etch stop layer) and 50% at the top. The grating period was 340 nm. The tapered grating layer was composed of a single, 760 nm thick layer having a refractive index of 2.03 at 633 nm wavelength for the spectral range shown. Material dispersions were included in all the calculations. This corresponds approximately to the refractive index of $SiN_x$ for the spectral range. Included in the structure was a 250 nm thick cap layer having a refractive index 1.46 for the spectral range (e.g., corresponding to $SiO_2$). The structure also included a layer corresponding to a 0.5 mm thick BK7 substrate, having refractive index 1.52 at 633 nm. Another layer, corresponding to an etch stop layer, is positioned between the substrate layer and the grating. This layer is 130 nm thick with a refractive index of 1.65 (corresponding, for example, to at 633 nm wavelength). The structure also included additional layers on top of the cap layer, namely, an 80 nm thick layer having a refractive index of 2.0 (e.g., corresponding to $HfO_2$) and a 125 nm thick layer having a refractive index 1.46 (e.g., corresponding to $SiO_2$).

The phase retardation spectrum labeled "Phi(II)" corresponds to a tapered, trapezoidal grating having a duty cycle of 70% at the bottom (i.e., adjacent the etch stop layer) and 50% at the top. The grating period was 320 nm. The tapered grating layer was composed of a single, 760 nm thick layer having a refractive index of 2.03 for the spectral range shown (e.g., corresponding to $SiN_x$). The layers corresponding to the substrate and etch stop layer were the same as for Phi(I). Included in the structure was a 250 nm thick cap layer having a refractive index 1.46 for the spectral range (e.g., corresponding to $SiO_2$). The structure also included additional layers on top of the cap layer, namely, an 80 nm thick layer having a refractive index of 2.00 (e.g., corresponding to $HfO_2$) and a 125 nm thick layer having a refractive index 1.46 (e.g., corresponding to $SiO_2$).

The phase retardation spectrum labeled "Phi(III)" corresponds to a tapered, trapezoidal grating having a duty cycle of 70% at the bottom (i.e., adjacent the etch stop layer) and 50% at the top. The grating period was 300 nm. The tapered grating layer was composed of a single, 760 nm thick layer having a refractive index of 2.03 for the spectral range shown (e.g., corresponding to $SiN_x$). The layers corresponding to the substrate and etch stop layer were the same as for Phi(I). Included in the structure was a 250 nm thick cap layer having a refractive index 1.46 for the spectral range (e.g., corresponding to $SiO_2$). The structure also included additional layers on top of the cap layer, namely, an 80 nm thick layer having a refractive index of 2.00 (e.g., corresponding to $HfO_2$) and a 125 nm thick layer having a refractive index 1.46 (e.g., corresponding to $SiO_2$).

The phase retardation spectrum labeled "Phi(IV)" corresponds to a tapered, trapezoidal grating having a duty cycle of 70% at the bottom (i.e., adjacent the etch stop layer) and 50% at the top. The grating period was 200 nm. The tapered grating layer was composed of a single layer having a refractive index of 2.00 for the spectral range shown (e.g., corresponding to $HfO_2$). The layers corresponding to the substrate and etch stop layer were the same as for Phi(I). Included in the structure was a 250 nm thick cap layer having a refractive index 1.46 for the spectral range (e.g., corresponding to $SiO_2$). The structure also included additional layers on top of the cap layer, namely, an 80 nm thick layer having a refractive index of 2.00 (e.g., corresponding to $HfO_2$) and a 125 nm thick layer having a refractive index 1.46 (e.g., corresponding to $SiO_2$).

The phase retardation spectrum labeled "Phi(650/785QWP)" corresponds to a tapered, trapezoidal grating having a duty cycle of 70% at the bottom (i.e., adjacent the etch stop layer) and 50% at the top. The grating period was 200 nm. The tapered grating layer was composed of a single layer having a refractive index of 2.05 for the spectral range shown (e.g., corresponding to $SiN_y$). The layers corresponding to the substrate and etch stop layer were the same as for Phi(I). Included in the structure was a 250 nm thick cap layer having a refractive index 1.46 for the spectral range (e.g., corresponding to $SiO_2$). The structure also included additional layers on top of the cap layer, namely, an 80 nm thick layer having a refractive index of 2.00 (e.g., corresponding to $HfO_2$) and a 125 nm thick layer having a refractive index 1.46 (e.g., corresponding to $SiO_2$).

The phase retardation spectrum labeled "Phi(Sim650–785DC)" corresponds to a rectangular grating having a duty cycle of 70%. The grating period was 320 nm. The grating layer was composed of a first, 750 nm thick layer having a refractive index of 2.05 for the spectral range shown (e.g., corresponding to $SiN_y$), and a second, 200 nm thick layer having a refractive index of 1.95. The layers corresponding to the substrate and etch stop layer were the same as for Phi(I). Included in the structure was a 250 nm thick cap layer having a refractive index about 1.46 for the spectral range (e.g., corresponding to $SiO_2$). The structure also included additional layers on top of the cap layer, namely, an 85 nm thick layer having a refractive index of 2.00 (e.g., corresponding to $HfO_2$) and a 130 nm thick layer having a refractive index 1.46 (e.g., corresponding to $SiO_2$).

Parameters for each of the phase retardation spectra are shown in Table I.

TABLE I

Phase retardation spectrum parameters for phase retardation spectra shown in FIG. 11.

| LEGEND IN FIG. 11 | $k_D$ | C | $R^2 = 1 - \epsilon^2$ | $\Delta$(%) | $3\sigma$ (%) |
|---|---|---|---|---|---|
| Phi(I) | 0.14 | 0.84 | 0.179 | −2.4 | 6.4 |
| Phi(II) | 0.50 | 0.49 | 0.904 | 10.2 | 10.0 |
| Phi(III) | 0.73 | 0.26 | 0.967 | 15.2 | 14.1 |
| Phi(IV) | 1.00 | 5.9e−3 | 0.997 | 20.6 | 18.8 |
| Phi(650/785QWP) | 1.21 | −0.19 | 0.998 | 24.3 | 22.5 |
| Phi(Sim650-785DC) | −0.058 | 1.06 | 0.351 | −1.2 | 1.9 |

In general, optical retarders can be used in a variety of applications in which polarized light is manipulated. In some embodiments, an optical retarder can be combined with one or more additional optical components to provide an optical device. For example, optical retarders can be incorporated onto other optical components (e.g., a reflector, a filter, a polarizer, a beamsplitter, a lens, and/or an electro-optic or magneto-optic component) by forming one or more grating layers on a surface of the component.

In certain embodiments, a device can include multiple grating layers. The grating layers can have the same profile (e.g., each can have a rectangular profile), or different grating layers can have different profiles (e.g., one or more grating layers can have a rectangular profile, while one or more layers can have a sawtooth or sinusoidal profile).

Figure 6:
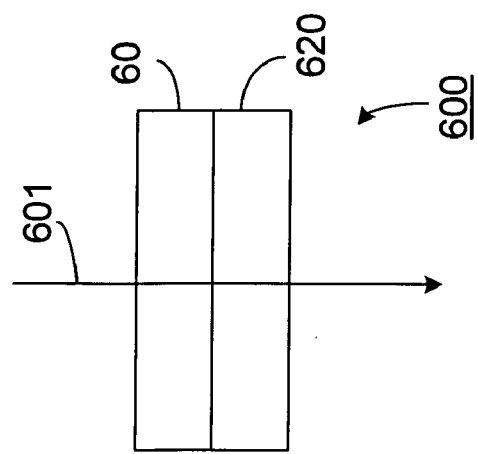
FIG. 6 is a schematic diagram of a polarizer including an optical retarder.

In some embodiments, a retardation film can be combined with a linear polarizing film to provide a polarizer that delivers light of a certain non-linear polarization (e.g., circularly polarized light or a specific elliptical polarization state). An example of such a device is polarizer 600, shown in FIG. 6. Polarizer 600 includes polarizing film 610 (e.g., an absorptive polarizing film, such as iodine-stained polyvinyl alcohol, or a reflective polarizer) and optical retarder 620. Film 610 linearly polarizes incident isotropic light propagating along axis 610. Subsequently, optical retarder 620 retards the polarized light exiting polarizing film 610, resulting in polarized light having a specific ellipticity and orientation of the elliptical axes. Alternatively, optical retarder 620 can be designed to rotate the electric field direction of the linearly polarized light exiting film 610. Polarizer 600 can be included in a variety of optical systems, such as, for example, a liquid crystal display (LCD) (e.g., a Liquid Crystal on Silicon (LCoS) LCD).

Figure 7:
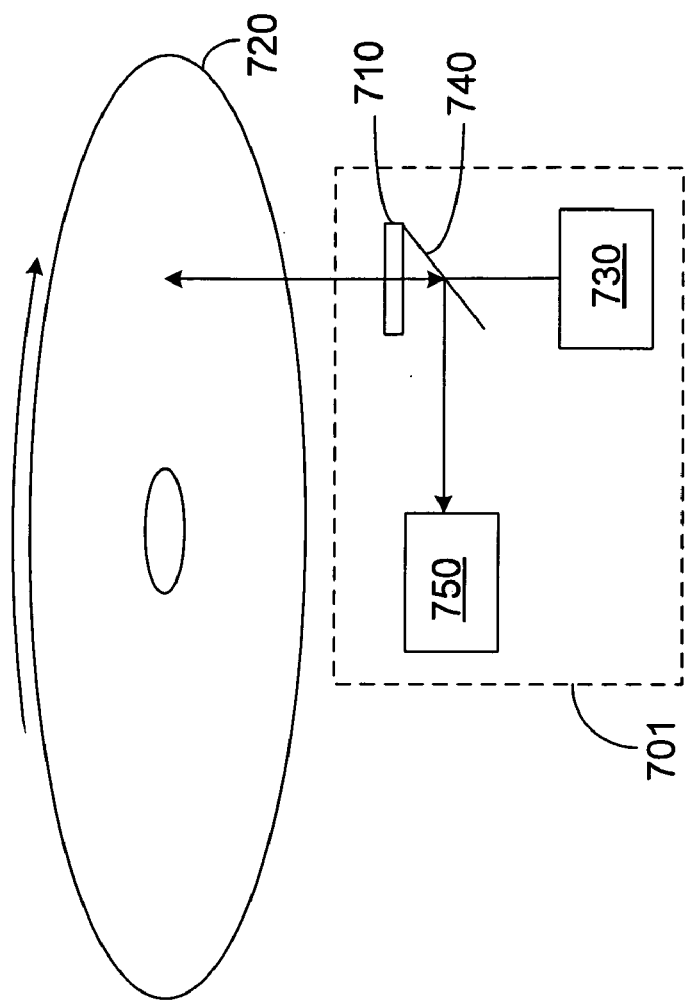
FIG. 7 is a schematic diagram of an optical pickup for reading/writing an optical storage medium.

As another example, referring to FIG. 7, in some embodiments, an optical retarder 710 can be included in an optical pickup 701 used for reading and/or writing to an optical storage medium 720 (e.g., a CD or DVD). In addition to optical retarder 710, optical pickup 701 also includes a light source 730 (e.g., one or more laser diodes), a polarizing beam splitter 740, and a detector 750. Optical retarder has quarter wave retardation at wavelengths $\lambda_1$ and $\lambda_2$ (e.g., 660 nm and 785 nm, respectively). During operation, light source 730 illuminates a surface of medium 720 with linearly polarized radiation at $\lambda_1$ and/or $\lambda_2$ as the medium spins (indicated by arrow 721). The polarized radiation passes through polarizing beam splitter 740. Optical retarder 710 retards the polarized radiation, changing it from linearly polarized radiation to substantially circularly polarized radiation. The circularly polarized radiation changes handedness upon reflection from medium 720, and is converted back to linearly polarized radiation upon its second pass through optical retarder 710. At beam splitter 740, the reflected radiation is polarized orthogonally relative to the original polarization state of the radiation emitted from light source 730. Accordingly, polarizing beam splitter reflects the radiation returning from medium 720, directed it to detector 750. The retarder can be integrated with the PBS in this device. The PBS can be a metal wire-grid polarizer.

The following examples are illustrative and not intended as limiting.

EXAMPLES

Optical retarders were prepared starting with a 0.5 mm thick BK7 wafer (four inches in diameter), obtained from Abrisa Corporation (Santa Paula, Calif.). The BK7 wafer was cleaned using the RCA-1 cleaning technique, rinsing with isopropyl alcohol and deionized water, and spin dried.

Initially, four layers of dielectric materials were deposited onto one side of the wafer (hereinafter the "backside" of the wafer) by e-beam evaporation with DC ion-gun assistance (IAD). The layers were $HfO_2/SiO_2/HfO_2/SiO_2$, acting as antireflection coating (ARC) for the BK7 substrate. In various samples, the residual reflection of the backside ARC was less than 1.0% (e.g., about 0.4%) in the wavelength range from about 620 nm to about 820 nm.

On the other side of the substrate (hereinafter referred to as the "frontside"), a 23 nm thick $HfO_2$ and 40 nm $SiO_2$ etch stop layer was deposited by e-beam evaporation with DC ion-gun assistance. This deposition was performed using a Temescal/FCE2700 model evaporator, obtained from BOC Edwards (Murray Hill, N.J.).

A 750 nm thick layer of SiN was deposited onto the $HfO_2/SiO_2$ layer by plasma enhanced CVD. This deposition was performed using a PlasmaTherm 790 at elevated temperatures, for example, at 300° C., obtained from Unaxis (St. Petersburg, Fla.). Next, a 170 nm thick layer of SiON was deposited onto the SiN layer using plasma enhanced CVD, with the PlasmaTherm 790. A 70 nm thick layer of $SiO_2$ was then deposited onto the layer of SiON, also using plasma enhanced CVD.

Layered walls were etched from the $SiN/SiON/SiO_2$ layer as follows. First, a UV-curable polymer about 120 nm to 250 nm thick was coated onto the wafer. Second, a contact imprinting method, nanolithography via imprint, was used to transfer a pattern from a template to the UV-curable polymer. Reactive ion etching (RIE) was used to transfer the pattern to the underlying layers. RIE was performed using $CHF_3/O_2$ as an active gas in a PlasmaTherm 790 RIE chamber from Unaxis.

Next, a hard mask of 100 nm thick Cr was evaporated onto the patterned polymer using a FC1800 evaporator (obtained from BOC Edwards). Another RIE step was performed on the patterned wafer in a PlasmaTherm 720 RIE chamber with active gas $CF_4$. The chamber pressure was held substantially constant during RIE at a pressure of about 4.0 to 8.0 mTorr.

The walls had a width of about 200 nm to about 230 nm, while the spaces between the walls were about 90 to about 130 nm wide. Accordingly, the grating period of each retarder was between about 290 nm and about 360 nm, with some close to 320 nm and 330 nm.

Residual resist was removed from the walls by etching. Etching was performed in three steps. First, residual Cr was removed using CR7. Next, residual polymer was removed using NanoStrip. Both CR7 and NanoStrip were obtained from Cyantek Co. (Fremont, Calif.). A final plasma ashing step with $O_2$ plasma completed the etching.

A $SiO_2$ cap layer was then formed by evaporating $SiO_2$ onto the walls at an angle of about 40° to about 50° with respect to the substrate normal. Evaporation of $SiO_2$ was performed using ion-assisted e-beam deposition (IAD) on a Temesca/FCE2700 (commercially available from BOC Edwards). Once a continuous layer of $SiO_2$ was formed (about 160 nm thick), $SiO_2$ evaporation normal to the substrate was performed to thicken the cap layer and provide a smooth surface for subsequent layers. The surface-normal deposition of $SiO_2$ was about 250 nm thick. An additional $HfO_2$ layer (about 45 nm thick) and another $SiO_2$ layer (about 150 nm thick) were then deposited by IAD e-beam evaporation.

Figure 8:
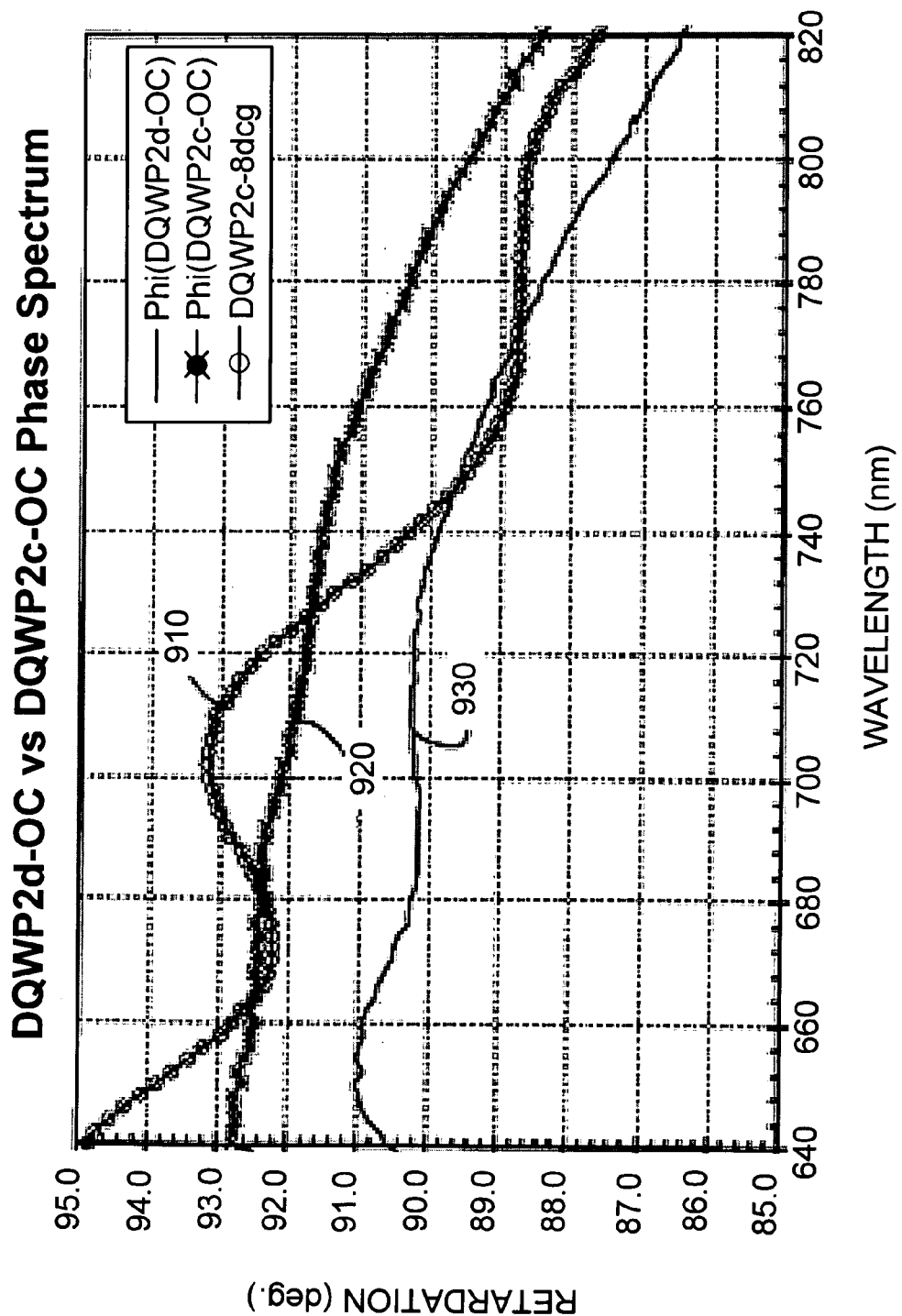
FIG. 8 is a plot of retardation as a function of wavelength for exemplary embodiments of optical retarders.

The retardation of optical retarders was measured using an M-2000V® Spectroscopic Ellipsometer (commercially available from J. A. Woollam Co., Inc., Lincoln, Nebr.). Referring to FIG. 8, measured retardation as a function of wavelength is shown for three different optical retarders over the wavelength range from 640 nm to 820 nm. Curve 910 corresponds to a retarder with a grating period of about 320 nm, while curves 920 and 930 correspond to retarders with a grating period of about 330 nm. Curves were measured for radiation incident normal to the optical retarder surface.

Figure 9:
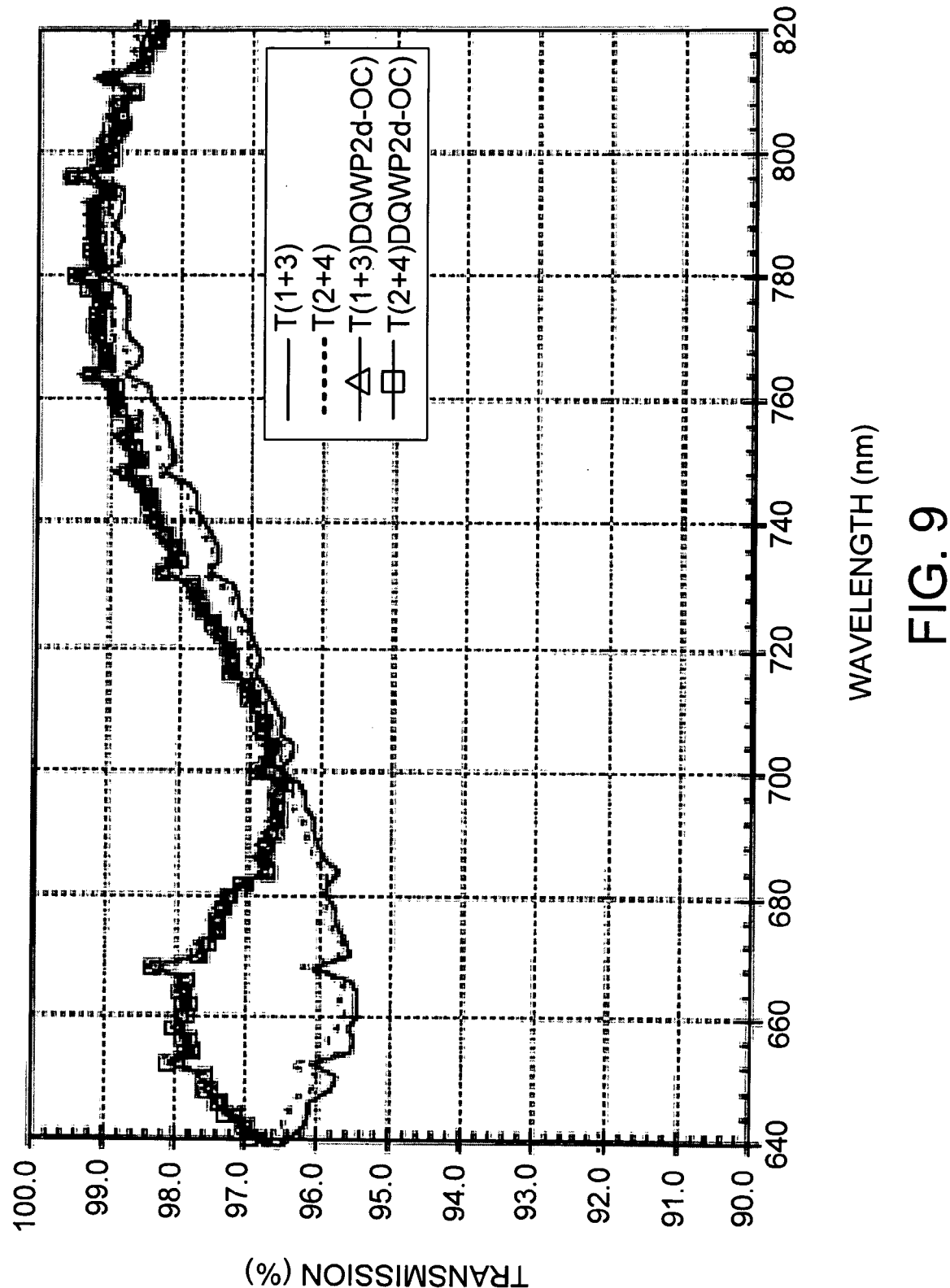
FIG. 9 is a plot of transmission as a function of wavelength for exemplary embodiments of optical retarders.

Referring to FIG. 9, transmission of optical retarders was measured using a spectrometer model UV Lambda 14 obtained from PerkinElmer (Wellesley, Mass.). The curves "T(1+3)" and "T(2+4)" correspond to the transmission of radiation polarized parallel and perpendicular to the walls of the grating layers in the optical retarders, respectively. The four curves illustrated in FIG. 9 were measured for optical retarders corresponding to curves 920 and 930 in FIG. 8. For both polarization states, transmission was substantially higher than 90% over the measured range.

Figure 10:
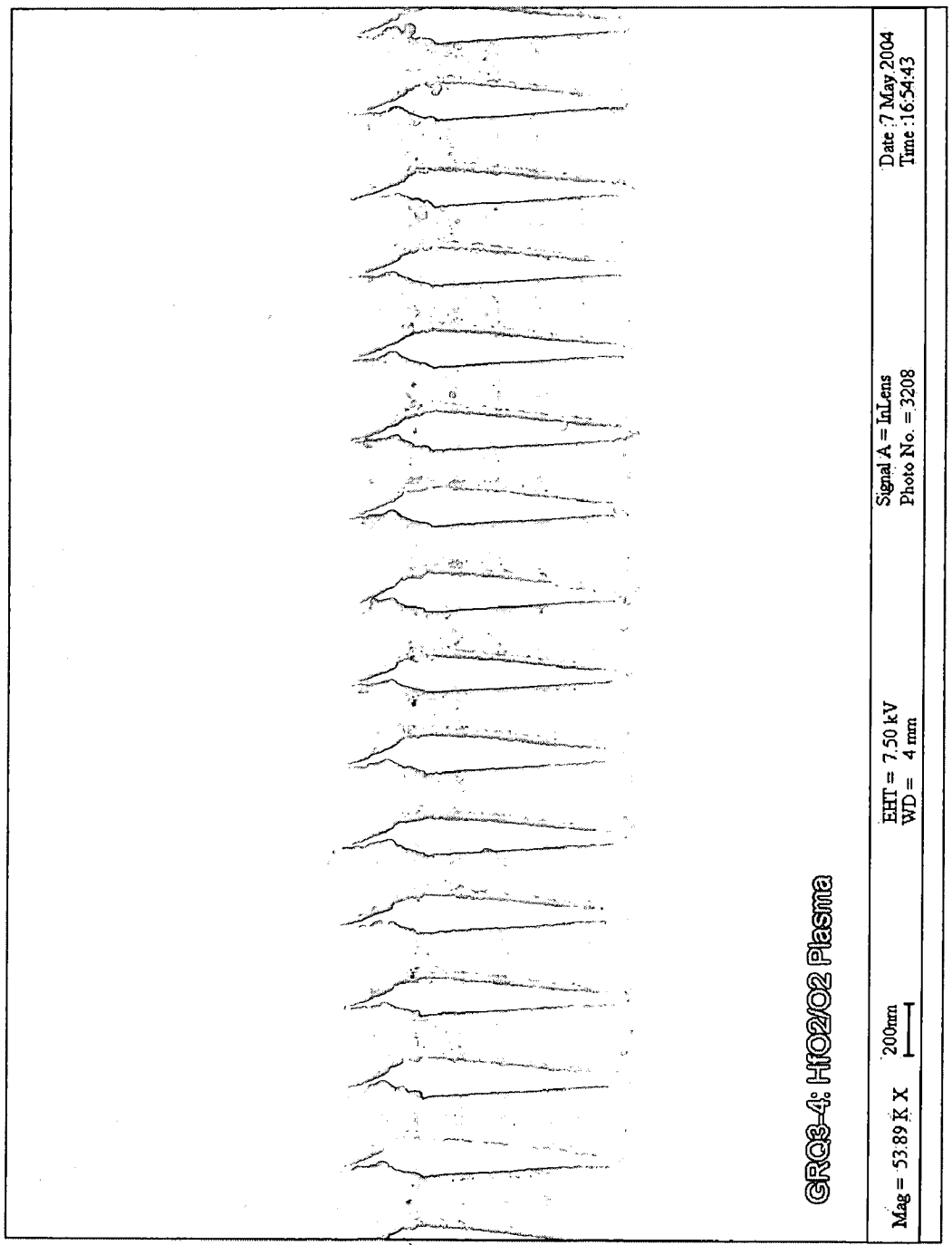
FIG. 10 is a scanning electron micrograph of an exemplary embodiment of an optical retarder.

An optical retarder was studied using scanning electron microscopy, which was performed using a LEO field-emission scanning electron microscope. To perform this study, a sample was cleaved and coated with a thin layer of Au. The cross section of the cleaved interface was then viewed. FIG. 10 shows a SEM micrographs of the grating.

A number of embodiments of the invention have been described. Nevertheless, it will be understood that various modifications may be made without departing from the spirit and scope of the invention. Accordingly, other embodiments are within the scope of the following claims.

What is claimed is:

1. An article, comprising:
    a plurality of walls configured to form a grating, each of the plurality of walls comprising:
    a layer of a first material;
    a layer of a second material different from the first material; and
    a layer of a third material different from the first material,
    wherein the layer of the third material of each wall is positioned between the layer of the first material of that wall and the layer of the first material of an adjacent wall, the layer of the third material is spaced apart from the layer of the first material of the adjacent wall, and the article is birefringent at wavelengths $\lambda_1$ and $\lambda_2$ and retards incident radiation at $\lambda_1$ and $\lambda_2$ by amounts $\Gamma_1$ and $\Gamma_2$, respectively, where $|\lambda_1-\lambda_2|$ is about 15 nm or more and $\Gamma_1$ is substantially equal to $\Gamma_2$.

2. The article of claim 1, wherein each wall further comprises a layer of a fourth material disposed on the layer of the second material, wherein the fourth material and the second materials are different.

3. The article of claim 2, wherein the fourth material is different from the first material.

4. The article of claim 2, wherein the fourth material is a dielectric material.

5. The article of claim 2, wherein the fourth material comprises a material selected from the group consisting of $SiN_x{:}H_z$, $SiO_xN_y{:}H_z$, $Al_2O_3$, $Ta_2O_5$, $Nb_2O_5$, $TaNb_xO_y$, $TiNb_xO_y$, $HfO_2$, $TiO_2$, $SiO_2$, $ZnO$, $LiNbO_3$, a-Si, Si, ZnSe, and ZnS, where x, y, and z are real numbers.

6. The article of claim 2, wherein each wall further comprises one or more additional layers disposed on the layer of the fourth material.

7. The article of claim 1, further comprising a substantially continuous layer of a fourth material disposed on the layer of the second material in each wall.

8. The article of claim 7, further comprising a substantially continuous layer deposited on the layer of the fourth material.

9. The article of claim 7, wherein the fourth material is different from the first material.

10. The article of claim 7, wherein the fourth material is a dielectric material.

11. The article of claim 7, wherein the fourth material comprises a material selected from the group consisting of $SiN_x{:}H_z$, $SiO_xN_y{:}H_z$, $Al_2O_3$, $Ta_2O_5$, $Nb_2O_5$, $TaNb_xO_y$, $TiNb_xO_y$, $HfO_2$, $TiO_2$, $SiO_2$, $ZnO$, $LiNbO_3$, a-Si, Si, ZnSe, and ZnS, where x, y, and z are real numbers.

12. The article of claim 1, wherein the third material is different from the second material.

13. The article of claim 1, wherein each wall further comprises a second layer of the third material disposed on the layer of the second material, the second layer of the third material being contiguous with the layer of the third material positioned between the layer of the first material of that wall and the layer of the first material of the adjacent wall.

14. The article of claim 1, wherein each wall further comprises a second layer of the third material, wherein the layer of the first material of each wall is positioned between the two layers of the third material.

15. The article of claim 1, wherein the article comprises a film of the third material that conforms to the first and second layer of each wall and the layer of the third material of each wall is a portion of the film.

16. The article of claim 1, wherein the third material is a dielectric material.

17. The article of claim 1, wherein each wall further comprises a layer of a fourth material positioned between the layer of the third material of that wall and the layer of the first material of an adjacent wall.

18. An article, comprising:
a plurality of walls configured to form a grating, each of the plurality of walls comprising:
a layer of a first material;
a layer of a second material different from the first material; and
a layer of a third material different from the first material,
wherein the layer of the third material of each wall is positioned between the layer of the first material of that wall and the layer of the first material of an adjacent wall, the layer of the third material is spaced apart from the layer of the first material of the adjacent wall, and the article retards a phase between orthogonal polarization states of incident radiation at wavelengths $\lambda_1$ and $\lambda_2$ by amounts $\Gamma_1$ and $\Gamma_2$, respectively, where $|\lambda_1-\lambda_2|$ is about 15 nm or more and $\lambda_1$ $\Gamma_1$ substantially equal to $\Gamma_2$.

* * * * *